US012802195B2

(12) United States Patent
Mutsuno

(10) Patent No.: US 12,802,195 B2
(45) Date of Patent: Nov. 17, 2026

(54) INSPECTION APPARATUS, CONTROL METHOD OF INSPECTION APPARATUS, AND STORAGE MEDIUM

(71) Applicant: CANON KABUSHIKI KAISHA, Tokyo (JP)

(72) Inventor: Masahiro Mutsuno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 282 days.

(21) Appl. No.: 18/450,955

(22) Filed: Aug. 16, 2023

(65) Prior Publication Data

US 2024/0070841 A1 Feb. 29, 2024

(30) Foreign Application Priority Data

Aug. 23, 2022 (JP) ................................ 2022-132245

(51) Int. Cl.
*G06T 7/00* (2017.01)

(52) U.S. Cl.
CPC .. *G06T 7/0004* (2013.01); *G06T 2207/30144* (2013.01)

(58) Field of Classification Search
CPC .................. G06T 7/0002; G06T 7/001; G06T 2207/30144
USPC ........................................................ 382/112
See application file for complete search history.

(56) References Cited

U.S. PATENT DOCUMENTS

2005/0240376 A1* 10/2005 Uwatoko ........... H04N 1/00015 702/183
2019/0132454 A1* 5/2019 Fukase .............. H04N 1/00045

FOREIGN PATENT DOCUMENTS

| | | | | |
|---|---|---|---|---|
| JP | 2016072693 | A | * | 5/2016 |
| JP | 2021133506 | A | | 9/2021 |
| JP | 2021184512 | A | | 12/2021 |
| JP | 2022066766 | A | | 5/2022 |
| JP | 2022117158 | A | | 8/2022 |

* cited by examiner

*Primary Examiner* — Jamares Q Washington
(74) *Attorney, Agent, or Firm* — Canon U.S.A., Inc. IP Division

(57) ABSTRACT

An inspection apparatus executes inspection to determine whether an image defect occurs in image data as an inspection target acquired by a reading unit by reading a printed matter printed on a recording sheet, acquires a type of the recording sheet used for the inspection according to an operation for inputting instructions to execute image diagnosis, performed on an instruction unit when an inspection result indicates existence of an image defect, and diagnoses content of the image defect by reading a chart for detecting an image defect, printed on a recording sheet of the acquired type.

17 Claims, 15 Drawing Sheets

FIG.4A

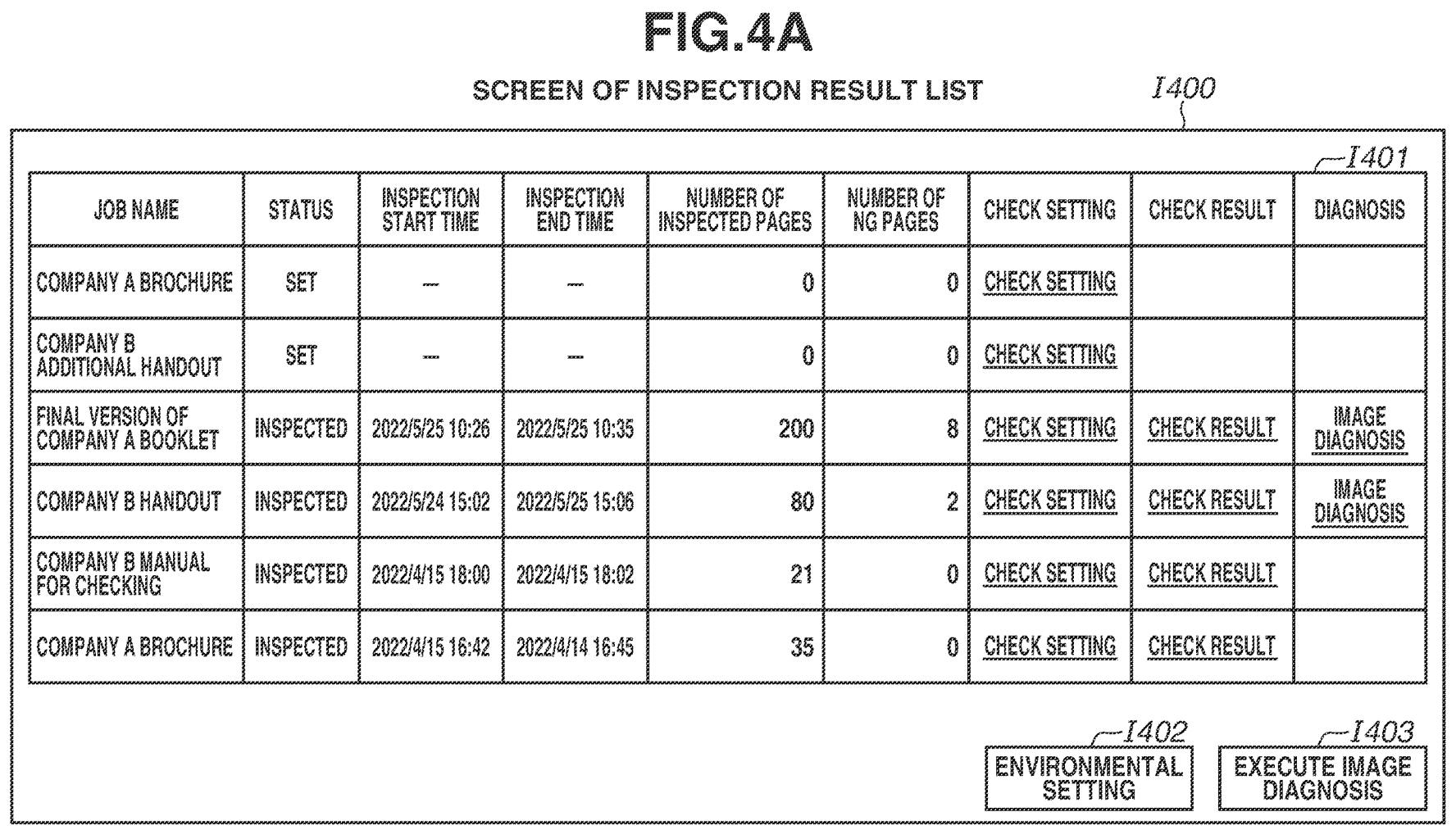

SCREEN OF INSPECTION RESULT LIST

1400

1401

| JOB NAME | STATUS | INSPECTION START TIME | INSPECTION END TIME | NUMBER OF INSPECTED PAGES | NUMBER OF NG PAGES | CHECK SETTING | CHECK RESULT | DIAGNOSIS |
|---|---|---|---|---|---|---|---|---|
| COMPANY A BROCHURE | SET | — | — | 0 | 0 | CHECK SETTING | | |
| COMPANY B ADDITIONAL HANDOUT | SET | — | — | 0 | 0 | CHECK SETTING | | |
| FINAL VERSION OF COMPANY A BOOKLET | INSPECTED | 2022/5/25 10:26 | 2022/5/25 10:35 | 200 | 8 | CHECK SETTING | CHECK RESULT | IMAGE DIAGNOSIS |
| COMPANY B HANDOUT | INSPECTED | 2022/5/24 15:02 | 2022/5/25 15:06 | 80 | 2 | CHECK SETTING | CHECK RESULT | IMAGE DIAGNOSIS |
| COMPANY B MANUAL FOR CHECKING | INSPECTED | 2022/4/15 18:00 | 2022/4/15 18:02 | 21 | 0 | CHECK SETTING | CHECK RESULT | |
| COMPANY A BROCHURE | INSPECTED | 2022/4/15 16:42 | 2022/4/14 16:45 | 35 | 0 | CHECK SETTING | CHECK RESULT | |

1402 ENVIRONMENTAL SETTING

1403 EXECUTE IMAGE DIAGNOSIS

INSPECTION RESULT CHECKING SCREEN

SCREEN OF IMAGE DIAGNOSIS SETTING

IMAGE DIAGNOSIS RESULT (NORMAL)

IMAGE DIAGNOSIS RESULT (AUTOMATIC CORRECTION)

IMAGE DIAGNOSIS RESULT (ABNORMAL)

FIG.10

| JOB NAME | INSERTION PAPER | SHEET SETTING | SHEET TYPE |
|---|---|---|---|
| FINAL VERSION OF COMPANY A BOOKLET | EXIST, TRAY 3 | A3: TRAY 2 | COATED PAPER |

INSPECTION APPARATUS, CONTROL METHOD OF INSPECTION APPARATUS, AND STORAGE MEDIUM

BACKGROUND

Field of the Disclosure

The present disclosure relates to an inspection apparatus, a control method of the inspection apparatus, and a storage medium.

Description of the Related Art

There is a system capable of detecting printing defects such as contamination and white spots occurring at the time of printing. The system acquires image data by reading a printed matter output from an image forming apparatus through a sensor, executes image processing on the acquired image data, and detects the printing defects by comparing the image data with the original of the print data.

The above-described printing defects may occur because of degradation of components within the image forming apparatus used for a long time. In such a case, in order to identify occurrence factors of the printing defects, an image diagnosis function of identifying phenomena and occurrence factors of defects by printing and reading, through a sensor, a dedicated chart has been provided.

According to a technique discussed in Japanese Patent Application Laid-Open No. 2021-133506, in a case where an inspection result of a printed matter indicates occurrence of an error, image formation is suspended, and processing for printing a chart used for identifying a printing defect factor is executed.

However, a method for controlling the system to make a sheet type of a chart used for identifying a defect factor of a printing matter conform to a sheet type used for inspection of the printed matter is not discussed in Japanese Patent Application Laid-Open No. 2021-133506.

SUMMARY

According to an aspect of the present disclosure, an inspection apparatus includes an inspection unit configured to execute inspection to determine whether an image defect occurs in image data as an inspection target acquired by a reading unit by reading a printed matter printed on a recording sheet, an acquisition unit configured to acquire a type of the recording sheet used for the inspection according to an operation for inputting instructions to execute image diagnosis, performed on an instruction unit when an inspection result acquired by the inspection unit indicates existence of an image defect, and an image diagnosis unit configured to diagnose content of the image defect by reading a chart for detecting an image defect, printed on a recording sheet of the type acquired by the acquisition unit.

According to another aspect of the present disclosure, an inspection apparatus includes an inspection unit configured to execute inspection to determine whether an image defect occurs in image data as an inspection target acquired by a reading unit by reading a printed matter printed on a recording sheet based on information about a print job, an acquisition unit configured to acquire a type of the recording sheet used for the inspection according to an operation for inputting instructions to execute image diagnosis, performed on an instruction unit when an inspection result acquired by the inspection unit indicates existence of an image defect, and an image diagnosis unit configured to diagnose content of image defects by reading a chart for detecting image defects, printed on a recording sheet based on information about the print job acquired by the acquisition unit.

Further features of the present disclosure will become apparent from the following description of embodiments with reference to the attached drawings.

BRIEF DESCRIPTION OF THE DRAWINGS

FIGS. 4A and 4B are diagrams illustrating examples of a user interface (UI) displaying a screen of an inspection job result.

FIG. 10 is a table illustrating an example of sheet information of an inspection job according to the present embodiment.

DESCRIPTION OF THE EMBODIMENTS

Exemplary embodiments of the present disclosure will be described in detail with reference to the appended drawings. Further, the embodiments described hereinafter are not intended to limit the present disclosure according to a scope of the patent claims, and not all of the combinations of features described in the embodiments are essentially required as the solutions of the present disclosure. An external controller according to the present embodiment is also called "image processing controller", "digital front-end (DFE)", "print sever", or "DFE". An image forming apparatus is also called "multifunction peripheral (MFP)" or "MFP".

Figure 1:
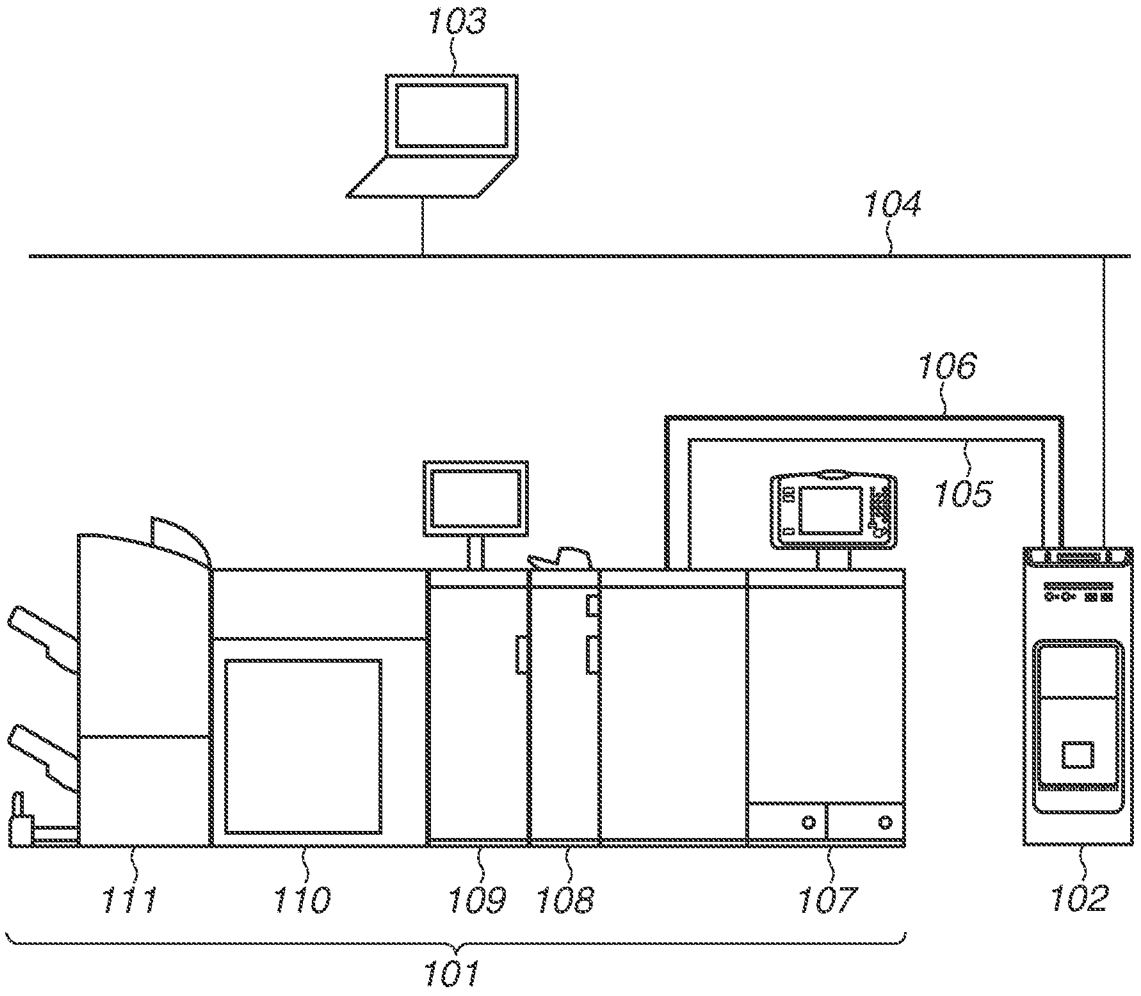
FIG. 1 is a diagram illustrating an entire hardware configuration of a printing system.

FIG. 1 is a diagram illustrating an entire hardware configuration of an image processing system according to a first embodiment. The image processing system includes an image forming apparatus 101 and an external controller 102. The image forming apparatus 101 and the external controller 102 are communicably connected to each other via an internal local area network (LAN) 105 and a video cable 106. The external controller 102 is communicably connected to a personal computer (PC) 103 via an external LAN 104, and a printing instruction is transmitted to the external controller 102 from the PC 103.

A printer driver having a function of converting print data to print description language processible by the external controller 102 is installed in the PC 103. A user who performs printing can input printing instructions from various applications via the printer driver. The printer driver transmits print data to the external controller 102 based on the printing instructions from the user. When the external controller 102 receives the printing instructions from the PC 103, the external controller 102 executes data analysis and rasterization processing, inputs the print data to the image forming apparatus 101, and instructs the image forming apparatus 101 to execute printing. The external controller 102 inputs print data to the image forming apparatus 101 via the internal LAN 105, and inputs rasterized image data thereto via the video cable 106.

Next, the image forming apparatus 101 is described. Apparatuses having different functions are connected to each other to constitute the image forming apparatus 101, so that the image forming apparatus 101 can execute complex printing processing such as bookbinding.

A printing apparatus 107 uses toner to form an image on a sheet conveyed from a sheet feeding unit arranged on the lower side of the printing apparatus 107. In the present embodiment, although a sheet of paper is taken as an example of a recording sheet, the recording sheet may be a sheet other than a sheet of paper used as a printing medium. For example, the recording sheet can be an overhead projector (OHP) sheet.

A configuration and an operating principle of the printing apparatus 107 are described below. The printing apparatus 107 makes a light beam (laser light) modulated according to image data be reflected on a rotating multifaceted mirror such as a polygonal mirror, and irradiates a photosensitive drum by the reflected light beam as scanning light.

An electrostatic latent image formed on the photosensitive drum by the laser beam is developed with toner, and the toner image is transferred to a sheet attached to a transfer drum. The series of image forming processes described above is sequentially executed with respect to toner of yellow (Y), magenta (M), cyan (C), and black (K), so that a full-color image is formed on the sheet. The sheet located on the transfer drum, on which the full-color image is formed, is conveyed to a fixing device. The fixing device includes a roller and a belt, and a heat source such as a halogen heater is built into the roller. The fixing device applies heat and pressure to the sheet, so that toner of the toner image transferred to the sheet is melted and fixed to the sheet. An inserter 108 is an apparatus for inserting insertion paper. The inserter 108 can insert insertion paper at an optional position with respect to a group of sheets printed and conveyed by the printing apparatus 107.

An inspection apparatus 109 generates image data by reading an image printed on a conveyed sheet (printed matter), and determines whether the printed image is normal by comparing the generated image data with pre-registered reference image data. For example, printed matters determined as normal and abnormal are discharged after being separated into normal printed matters and erroneous printed matters, respectively.

A large-capacity stacker 110 can stack a large amount of sheets. A finisher 111 executes finishing processing on conveyed sheets. The finisher 111 executes finishing processing such as stapling, punching, and saddle stitch bookbinding depending on settings, and discharges the processed sheets to a sheet discharge tray.

Although the printing system illustrated in FIG. 1 includes the external controller 102 connected to the image forming apparatus 101, the present disclosure is not limited to the configuration in which the external controller 102 is connected thereto.

In other words, the image forming apparatus 101 may be connected to the external LAN 104, so that print data processible by the image forming apparatus 101 is transmitted from the PC 103. In this case, printing processing is executed after data analysis and rasterization processing are executed by the image forming apparatus 101.

Figure 2:
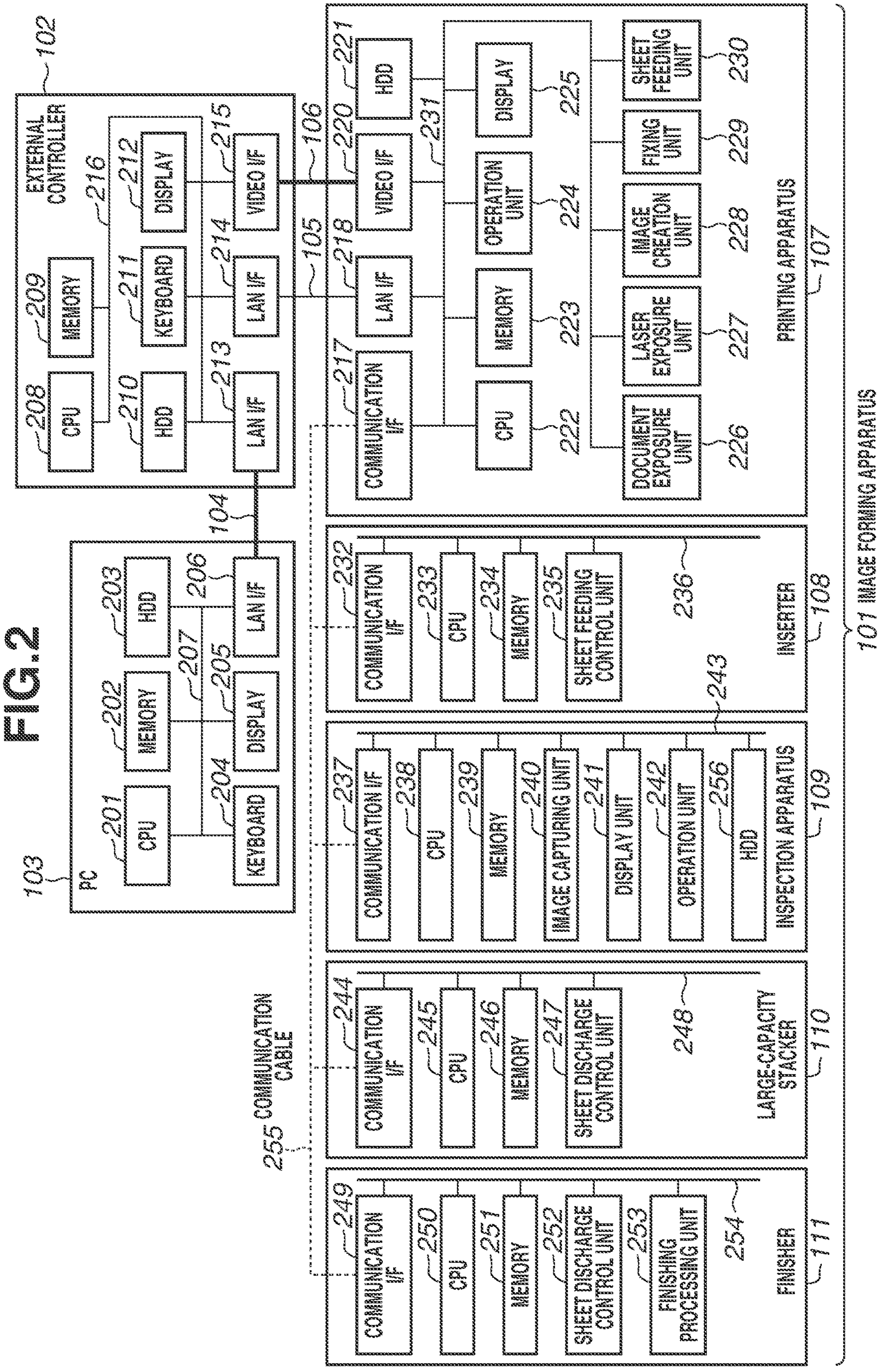
FIG. 2 is a block diagram illustrating a system configuration of the printing system.

FIG. 2 is a block diagram illustrating system configurations of the image forming apparatus 101, the external controller 102, and the PC 103.

First, a configuration of the printing apparatus 107 included in the image forming apparatus 101 is described. The printing apparatus 107 of the image forming apparatus 101 includes a communication interface (I/F) 217, a LAN I/F 218, a video I/F 220, a hard disk drive (HDD) 221, a central processing unit (CPU) 222, a memory 223, an operation unit 224, and a display 225. The printing apparatus 107 of the image forming apparatus 101 further includes a document exposure unit 226, a laser exposure unit 227, an image creation unit 228, a fixing unit 229, and a sheet feeding unit 230. These constituent elements are connected to each other via a system bus 231.

The communication I/F 217 is connected to the inserter 108, the inspection apparatus 109, the large-capacity stacker 110, and the finisher 111 via a communication cable 255, so that communication for controlling the respective apparatuses is executed.

The LAN I/F 218 is connected to the external controller 102 via an internal LAN 105, so that communication for transmitting/receiving print data is executed.

The video I/F 220 is connected to the external controller 102 via a video cable 106, so that communication for transmitting/receiving rasterized image data is executed.

The HDD 221 is a storage device which stores programs and data. The CPU 222 comprehensively executes image processing control and printing control based on the programs stored in the HDD 221. The memory 223 stores programs and image data necessary when the CPU 222 executes various types of processing, and also operates as a work area.

The operation unit 224 receives inputs of various settings and instructions to execute operation from the user. Setting information of the image forming apparatus 101 and a processing status of a print job are displayed on the display 225. The document exposure unit 226 executes processing for reading documents when a copy function and a scanning function are used.

The document exposure unit 226 reads document data by capturing an image through a charge-coupled device (CCD) camera while illuminating a sheet placed by the user with an exposure lamp.

The laser exposure unit 227 executes primary charge and laser exposure to irradiate the photosensitive drum with laser light in order to transfer a toner image. First, the laser exposure unit 227 executes primary charge to electrically charge a surface of the photosensitive drum at a uniform negative potential. Next, the laser exposure unit 227 irradiates the photosensitive drum with laser light through a laser driver while adjusting the reflection angle with a polygonal mirror. Through the above operation, negative electric charge of the irradiated portion is neutralized, and an electrostatic latent image is formed thereon. The image creation unit 228 is an apparatus for transferring toner to a sheet. The image creation unit 228 includes a development unit, a transfer unit, and a toner replenishing unit, and transfers toner on the photosensitive drum to a sheet.

The development unit visualizes the electrostatic latent image formed on the surface of the photosensitive drum by making negatively-charged toner supplied from a development cylinder adhere to the image. The transfer unit executes primary transfer to transfer toner adhering to the surface of the photosensitive drum to a transfer belt by applying positive potential to a primary transfer roller, and executes secondary transfer to transfer the toner on the transfer belt to a sheet by applying positive potential to a secondary transfer outer roller. The fixing unit 229 is a device for melting and fixing the toner transferred to the sheet by applying heat and pressure thereto. The fixing unit 229 includes a heater, a fixing belt, and a pressure belt. The sheet feeding unit 230 is a device for feeding sheets, and the operation for feeding and conveying a sheet is controlled by rollers and various sensors.

Next, a configuration of the inserter 108 of the image forming apparatus 101 is described. The inserter 108 of the image forming apparatus 101 includes a communication I/F 232, a CPU 233, a memory 234, and a sheet feeding control unit 235. These constituent elements are connected to each other via a system bus 236. The communication I/F 232 is connected to the printing apparatus 107 via the communication cable 255, so that communication necessary to execute control processing is executed. According to a control program stored in the memory 234, the CPU 233 executes various types of control necessary to execute sheet feeding operation. The memory 234 is a storage device which stores a control program. The sheet feeding control unit 235 controls feeding and conveyance of a sheet conveyed from a sheet feeding unit of the inserter 108 or the printing apparatus 107 by controlling the rollers and sensors based on the instruction from the CPU 222.

Next, a configuration of the inspection apparatus 109 included in the image forming apparatus 101 is described. The inspection apparatus 109 of the image forming apparatus 101 includes a communication I/F 237, a CPU 238, a memory 239, an image capturing unit 240, a display unit 241, an operation unit 242, and a HDD 256. These constituent elements are connected to each other via a system bus 243. The communication I/F 237 is connected to the printing apparatus 107 via the communication cable 255, so that communication necessary to execute control processing is executed.

Further, the inspection apparatus 109 also receives a reference image used for the inspection from the printing apparatus 107 via the communication cable 255 and the communication I/F 237, and stores the received reference image in the HDD 256. According to a control program stored in the memory 239, the CPU 238 executes various types of control necessary to execute inspection. The memory 239 is a storage device which stores a control program. A method of receiving and storing the reference image is not limited to the above. For example, the inspection apparatus 109 may have a LAN OF and communicate with the external controller 102 via an internal LAN. In this case, the inspection apparatus 109 can execute similar operation by receiving the reference image from the external controller 102 via the LAN I/F and storing the reference image in the HDD 256.

The image capturing unit 240 captures an image of a conveyed sheet based on the instruction from the CPU 238. The CPU 238 determines whether a printed image is normal by comparing the image captured by the image capturing unit 240 with the reference image stored in the HDD 256. The display unit 241 displays an inspection result and a setting screen. The operation unit 242 is operated by the user, and receives instructions to change the settings of the inspection apparatus 109 or to register a reference image. The HDD 256 stores the reference image.

In a case where the HDD 256 is not arranged thereon, a reference image may be stored in the HDD 221 so that the inspection apparatus 109 uses the reference image by reading out the reference image from the HDD 211 to the memory 239 when the inspection apparatus 109 executes the processing for determining whether the printed image is normal.

Next, a configuration of the large-capacity stacker 110 of the image forming apparatus 101 is described. The large-capacity stacker 110 of the image forming apparatus 101 includes a communication I/F 244, a CPU 245, a memory 246, and a sheet discharge control unit 247. These constituent elements are connected to each other via a system bus 248. The communication I/F 244 is connected to the printing apparatus 107 via the communication cable 255, so that communication necessary to execute control processing is executed. According to a control program stored in the memory 246, the CPU 245 executes various types of control necessary to execute sheet discharge processing. The memory 246 is a storage device which stores a control program. Based on the instruction from the CPU 245, the sheet discharge control unit 247 executes control for conveying a conveyed sheet to a stack tray, an escape tray, or the finisher 111 arranged at a succeeding position.

Next, a configuration of the finisher 111 of the image forming apparatus 101 is described. The finisher 111 of the image forming apparatus 101 includes a communication I/F 249, a CPU 250, a memory 251, a sheet discharge control unit 252, and a finishing processing unit 253. These constituent elements are connected to each other via a system bus 254. The communication I/F 249 is connected to the printing apparatus 107 via the communication cable 255, so that communication necessary to execute control processing is executed. According to a control program stored in the memory 251, the CPU 250 executes various types of control necessary to execute finishing processing and sheet discharge processing. The memory 251 is a storage device which stores a control program. The sheet discharge control unit 252 controls conveyance and discharge of a sheet based on the instruction from the CPU 250. The finishing processing unit 253 controls finishing processing such as stapling, punching, and saddle stitch bookbinding based on the instruction from the CPU 250.

Next, a configuration of the external controller 102 is described. The external controller 102 includes a CPU 208, a memory 209, a HDD 210, a keyboard 211, a display 212, a LAN I/F 213, a LAN I/F 214, and a video I/F 215. These constituent elements are connected to each other via a system bus 216. Based on the program and data stored in the HDD 210, the CPU 208 comprehensively executes processing for receiving print data from the PC 103, raster image processing (RIP), and processing for transmitting a print job to the image forming apparatus 101.

The memory 209 stores programs and data necessary when the CPU 208 executes various types of processing, and also operates as a work area. Programs and data necessary to execute printing processing are stored in the HDD 210. The keyboard 211 is a device for inputting an operation instruction of the external controller 102. Information about an execution application of the external controller 102 is displayed on the display 212 through a video signal of a still image or a moving image. The LAN OF 213 is connected to the PC 103 via the external LAN 104, so that communication for transmitting/receiving printing instructions is executed. The LAN I/F 214 is connected to the image forming apparatus 101 via the internal LAN 105, so that communication for transmitting/receiving a print job as a printing instruction is executed. The video I/F 215 is connected to the image forming apparatus 101 via the video cable 106, so that communication for transmitting/receiving rasterized image data is executed.

Next, a configuration of the PC 103 is described. The PC 103 includes a CPU 201, a memory 202, a HDD 203, a keyboard 204, a display 205, and a LAN I/F 206. These constituent elements are connected to each other via a system bus 207. Based on a document processing program stored in the HDD 203, the CPU 201 creates print data and transmits a printing instruction.

Further, the CPU 201 comprehensively controls respective devices connected to the system bus 207. The memory 202 stores programs and data necessary when the CPU 201 executes various types of processing, and also operates as a work area. Programs and data necessary to execute printing processing are stored in the HDD 203. The keyboard 204 is a device for inputting an operation instruction of the PC 103. Information about an execution application of the PC 103 is displayed on the display 205 through a video signal of a still image or a moving image. The LAN I/F 206 is connected to the external LAN 104, so that communication for transmitting/receiving printing instructions is executed.

In the above-described configuration, the external controller 102 and the image forming apparatus 101 are connected to each other via the internal LAN 105 and the video cable 106. However, for example, the external controller 102 and the image forming apparatus 101 may be connected to each other via only a video cable, as long as transmission/reception of data necessary to execute printing can be executed. Further, each of the memories 202, 209, 223, 234, 239, 246, and 251 may be a storage device for retaining data and programs. For example, a volatile random access memory (RAM), a non-volatile read only memory (ROM), a built-in HDD, an external HDD, or a universal serial bus (USB) memory can be substituted therefor.

Figure 3:
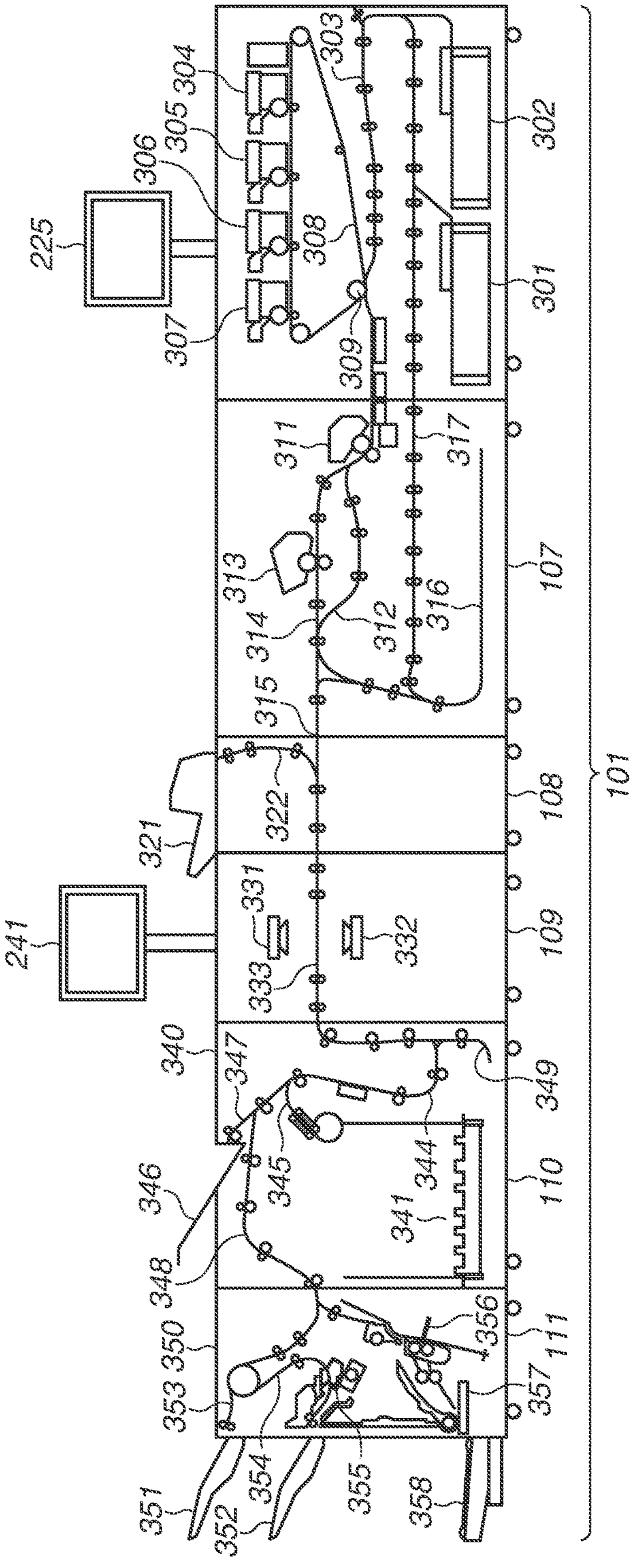
FIG. 3 is a cross-sectional diagram of an image forming apparatus.

FIG. 3 is a cross-sectional diagram illustrating a mechanical structure of the image forming apparatus 101. The printing apparatus 107 forms an image to be printed on a sheet. Various types of sheets can be stored in sheet-feeding decks 301 and 302. The information about sheets (i.e., a sheet size and a sheet type) stored in each of the sheet-feeding decks 301 and 302 can be set through the operation unit 224 of the printing apparatus 107. For example, the sheet type is a coated sheet or paper sheet.

The image forming apparatus 101 can separate only an uppermost sheet from the sheets stored in the sheet-feeding deck 301 or 302 to convey the sheet to a sheet conveyance path 303. Development stations 304 to 307 form toner images by using toner of respective colors Y, M, C, and K in order to form a color image. The toner images formed thereby are primarily transferred to an intermediate transfer belt 308, and further transferred to a sheet conveyed from the sheet conveyance path 303 at a secondary transfer position 309 while the intermediate transfer belt 308 is being rotated in a clockwise direction.

A display 225 displays a printing status and setting information of the image forming apparatus 101. A fixing unit 311 fixes the toner image to a sheet. The fixing unit 311 includes a pressure roller and a heating roller, and fixes the toner image to the sheet by melting and pressurizing toner when the sheet passes through the respective rollers. The sheet moved out of the fixing unit 311 is conveyed to a sheet conveyance path 315 via a sheet conveyance path 312.

Depending on a sheet type, toner has to be further melted and pressurized for the sake of fixation. In such a case, the sheet is conveyed to a second fixing unit 313 via the sheet conveyance path above after passing through the fixing unit 311. After additional melting and pressurizing processing is executed on the sheet at the second fixing unit 313, the sheet is conveyed to the sheet conveyance path 315 via a sheet conveyance path 314. In a case where a two-sided image forming mode is selected, the sheet is conveyed to a sheet reversing path 316. After the sheet is reversed at the sheet reversing path 316, the sheet is conveyed to a two-sided conveyance path 317, and an image is transferred to a second face thereof at the secondary transfer position 309.

The inserter 108 inserts an insertion sheet. The inserter 108 includes an inserter tray 321, and the insertion sheet fed to the inserter tray 321 is joined to the conveyance path through a sheet conveyance path 322. With this configuration, the insertion sheet can be inserted to an optional position of the sheets sequentially conveyed from the printing apparatus 107 and conveyed to the subsequent apparatus.

The sheets passing through the inserter 108 are conveyed to the inspection apparatus 109. Cameras 331 and 332 are arranged to face each other in the inspection apparatus 109. The camera 331 reads an upper face of a sheet, and the camera 332 reads a lower face of the sheet. The inspection apparatus 109 can determine whether images of the sheet are normal by reading the images of the sheet through the cameras 331 and 332 at a timing when the sheet conveyed to a sheet conveyance path 333 has reached a predetermined position. A result of inspection executed by the inspection apparatus 109 is displayed on the display unit 241.

The large-capacity stacker 110 is a large-capacity stacker capable of stacking a large amount of sheets.

The large-capacity stacker 110 includes a stack tray 341 for stacking a sheet determined as a normal sheet (printed matter) by the inspection apparatus 109. The sheet passing through the inspection apparatus 109 is input to the large-capacity stacker 110 through the sheet conveyance path 344. The sheet is stacked on the stack tray 341 from the sheet conveyance path 344 via a sheet conveyance path 345.

The large-capacity stacker 110 further includes an escape tray 346 as a sheet discharge tray. The escape tray 346 is a sheet discharge tray used for discharging a sheet determined as a sheet (printed matter) having an error by the inspection apparatus 109. When the sheet is output to the escape tray 346, the sheet is conveyed to the escape tray 346 from the sheet conveyance path 344 via a sheet conveyance path 347. In a case where the sheet is conveyed to a post-processing apparatus arranged on the subsequent stage of the large-capacity stacker 110, the sheet is conveyed thereto via a sheet conveyance path 348. A reversing part 349 reverses the sheet. The reversing part 349 is used when the sheet is stacked on the stack tray 341.

In a case where the sheet is stacked on the stack tray 341, the sheet is reversed at the reversing part 349 once, so that the orientation of the sheet at the time of output conforms to the orientation thereof at the time of input. In a case where the sheet is conveyed to the escape tray 346 or the post-processing apparatus provided on the subsequent stage, the reversing operation is not executed at the reversing part 349 because the sheet is discharged and stacked as is without being flipped over.

The finisher 111 executes finishing processing on the conveyed sheet depending on a function specified by the user. Specifically, the finisher 111 has finishing functions such as a stapling function (one-place/two-place binding), a punching function (two-hole/three-hole), and a saddle stich bookbinding function. The finisher 111 includes sheet discharge trays 351 and 352. The sheet is output to the sheet discharge tray 351 via a sheet conveyance path 353. However, finishing processing such as stapling cannot be executed at the sheet conveyance path 353.

In a case where the finishing processing such as stapling is executed, the sheet is conveyed to a processing unit 355 via a sheet conveyance path 354, and a finishing function specified by the user is executed by the processing unit 355. Thereafter, the sheet is discharged to the sheet discharge tray 352. The sheet discharge trays 351 and 352 can move up and down. Therefore, the sheet on which finishing processing is executed by the processing unit 355 can be stacked on the sheet discharge tray 351 by making the sheet discharge tray 351 move downward. In a case where the saddle stich bookbinding function is specified, sheets are folded in half after a saddle stich binding processing unit 356 executes stapling processing on a central part of the sheets, and the folded sheets are output to a saddle stich bookbinding tray 358 via a sheet conveyance path 357. The saddle stich bookbinding tray 358 has a conveyer belt structure, so that a bundle of sheets bound through the saddle stich bookbinding and stacked on the saddle stich bookbinding tray 358 is conveyed to the left side.

Figure 4B:
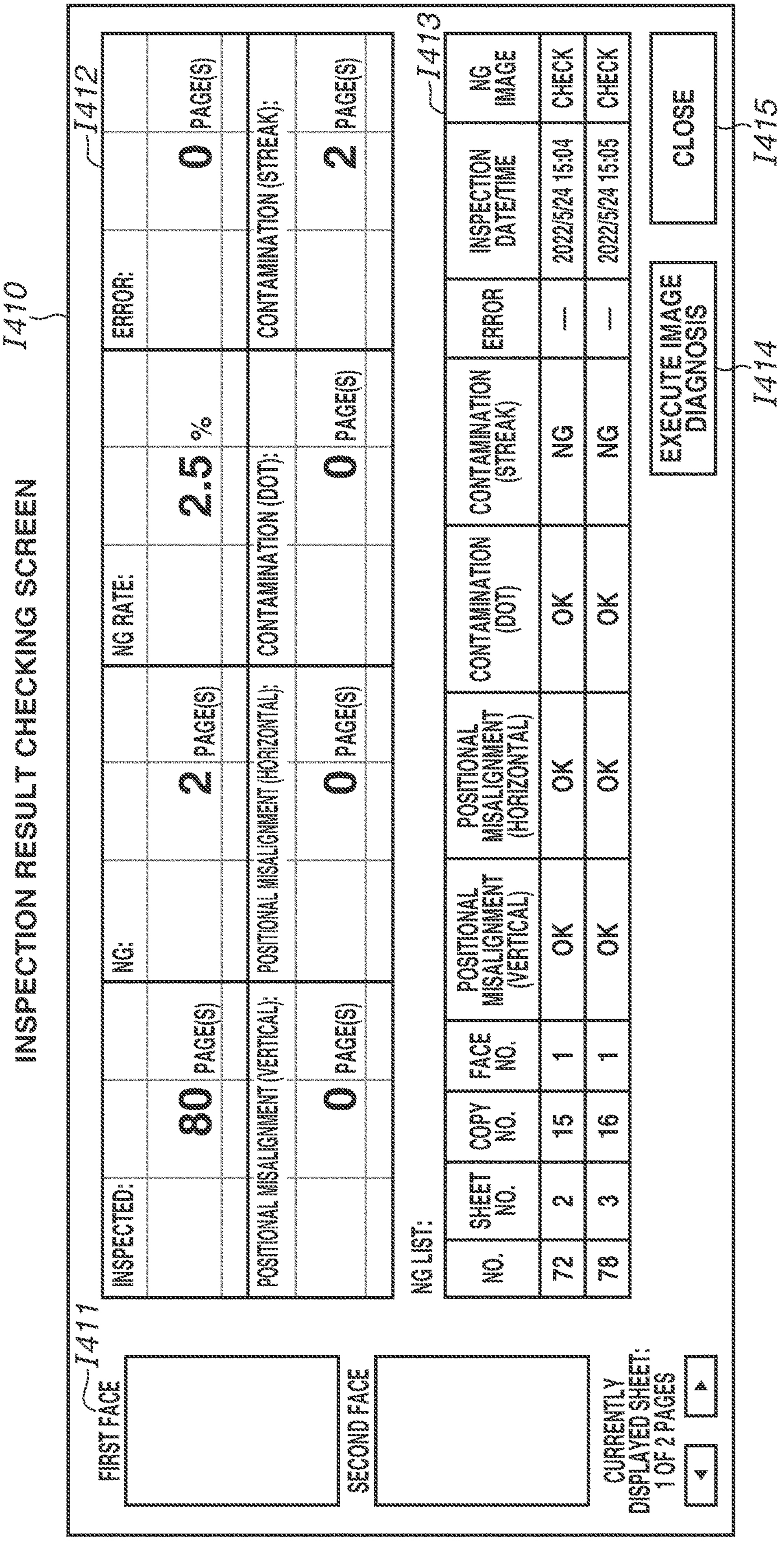

FIGS. 4A and 4B are diagrams illustrating examples of screens which display results of automatic inspection according to the present embodiment. These screens are displayed on the display unit 241 through display control. These screens for displaying the results of automatic inspection may be displayed on the display 225 of the printing apparatus 107 or the display 212 of the external controller 102.

FIG. 4A illustrates an example of a screen which displays a list of automatic inspection results. An inspection result list screen I400 includes an inspection result list I401, an environmental setting button I402, and an image diagnosis execution button I403 (an instruction unit for inputting instructions to execute image diagnosis). The inspection result list I401 displays a list of results of inspection jobs registered as inspection jobs. As a result of each of the inspection jobs, the inspection result list I401 displays a job name for identifying a job, a status describing an execution status of the inspection job, an inspection start time, an inspection end time, the number of inspected pages, and the number of no-good (NG) pages. The inspection result list I401 further displays a Check Setting link for making the screen I400 be shifted to a screen for checking a setting of the selected inspection job, a Check Result link for making the screen I400 be shifted to an inspection result checking screen I410, and an Image Diagnosis link (an instruction unit for inputting instructions to execute image diagnosis) for making the screen I400 be shifted to a screen for executing image diagnosis based on the inspection result. An inspected job (i.e., a job which is inspected already) and an uninspected job (i.e., a job which is set already but has not been inspected) are described in the inspection result list I401. With respect to the inspected job, “Inspected” is described as a status thereof, and an inspection start time, an inspection end time, the number of inspected pages, and the number of NG pages are displayed. Furthermore, a link for making the screen I400 be shifted to the inspection result checking screen I410 is displayed. In a case where the inspection result is “NG”, the Image Diagnosis link is displayed thereon. With respect to the uninspected job, “Set” is described as a status thereof, and undetermined values are displayed with respect to the other items. The environmental setting button I402 is a button for displaying an environmental setting screen of the present system. When the user selects the environmental setting button I402, the screen I400 is shifted to an image diagnosis environmental setting screen I500. The image diagnosis execution button I403 is a button for displaying a screen for executing image diagnosis. When the user selects the image diagnosis execution button I403, the screen I400 is shifted to an image diagnosis setting screen I600.

FIG. 4B illustrates an example of a screen for checking the inspection result. The inspection result checking screen I410 is a screen which displays details of the inspection result of the selected job when the Check Result link of the inspected job is selected from the inspection result list I401. In the example illustrated in FIG. 4B, a 5-page print job is executed by 16 copies, i.e., 80 pages are printed in total, and 2 pages are determined as “NG” through the inspection. The inspection result checking screen I410 includes an inspection NG thumbnail I411, a collected inspection result I412, an NG list I413, an image diagnosis execution button I414, and a close button I415. The inspection NG thumbnail I411 displays read images of the front face and the back face of the sheet determined as “NG” as a result of the inspection. When “NG” is determined with respect to a plurality of sheets, the images can be changed to images of another sheet determined as “NG” through the inspection by selecting a select button displayed on the lower side of the inspection NG thumbnail I411. The collected inspection result I412 displays a collection of inspection results of the inspection job. In FIG. 4B, the collected inspection result I412 displays the number of inspected pages, the number of pages determined as “NG” as a result of inspection, an NG rate, the number of error pages of which printing/reading cannot be executed, and a total number of defect factors, such as vertical positional misalignment, horizontal positional misalignment, dot-like contamination, and streak-like contamination, determined through the inspection. With respect to each of the NG pages, the NG list I413 displays a page sequence number in the entire inspection jobs, a page sequence number in the job, a copy number, a face number (i.e., front or back), an NG factor indicating whether an inspection result is “OK” or “NG”, an inspection data/time, and a link for checking a read image of the page determined as “NG”. In a case where the link for checking the NG image is selected, a read image of the page determined as “NG” through the inspection is displayed. The image diagnosis execution button I414 is a button for inputting an instruction to execute image diagnosis. When the image diagnosis execution button I414 is selected, the screen I410 is shifted to the image diagnosis setting screen I600. The close button I415 is a button for inputting an instruction to close the inspection result checking screen I410. When the close button I415 is selected, the screen I410 is shifted to the inspection result list screen I400 previously displayed.

Figure 5A:
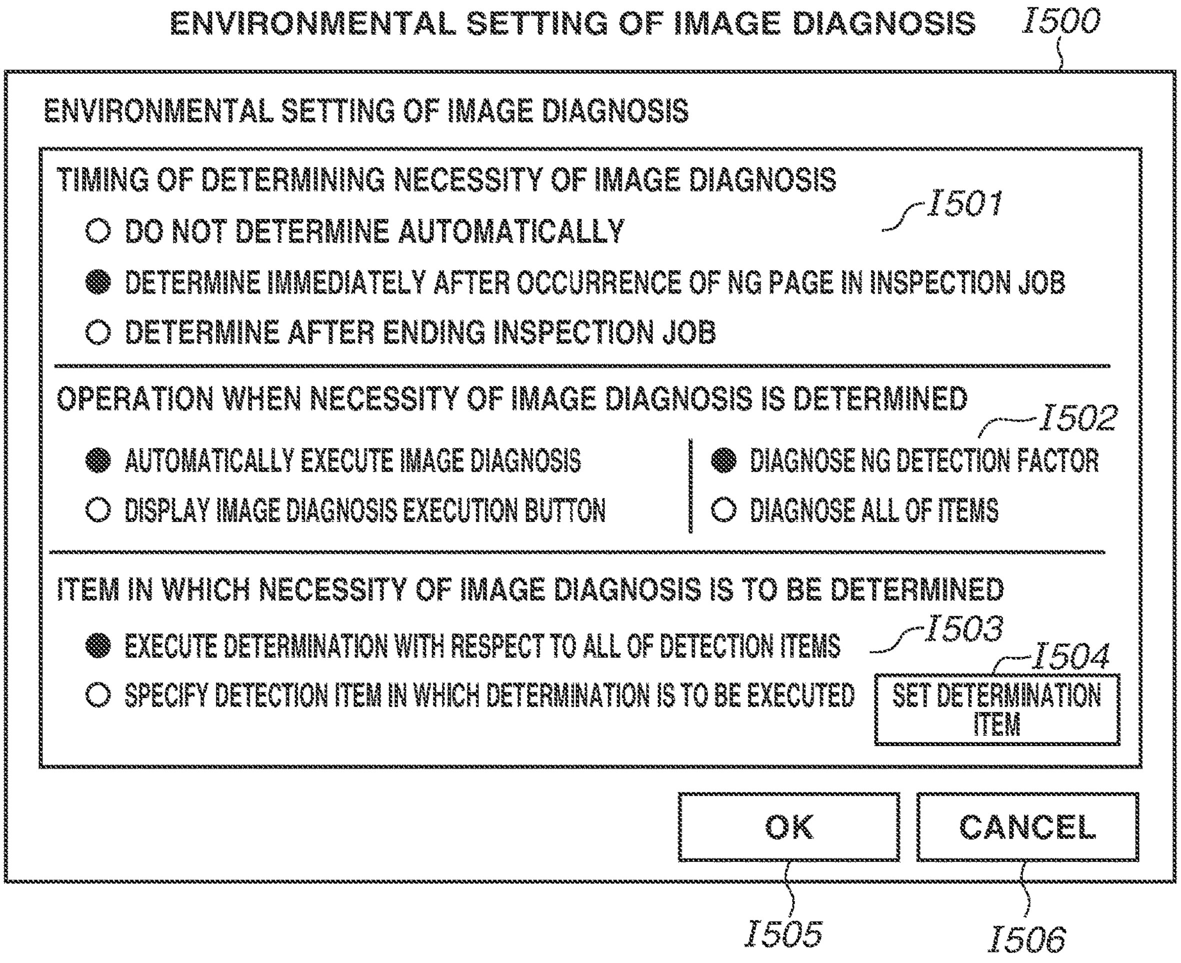
FIGS. 5A and 5B are diagrams illustrating examples of a UI displaying a detailed setting screen.
Figure 5B:
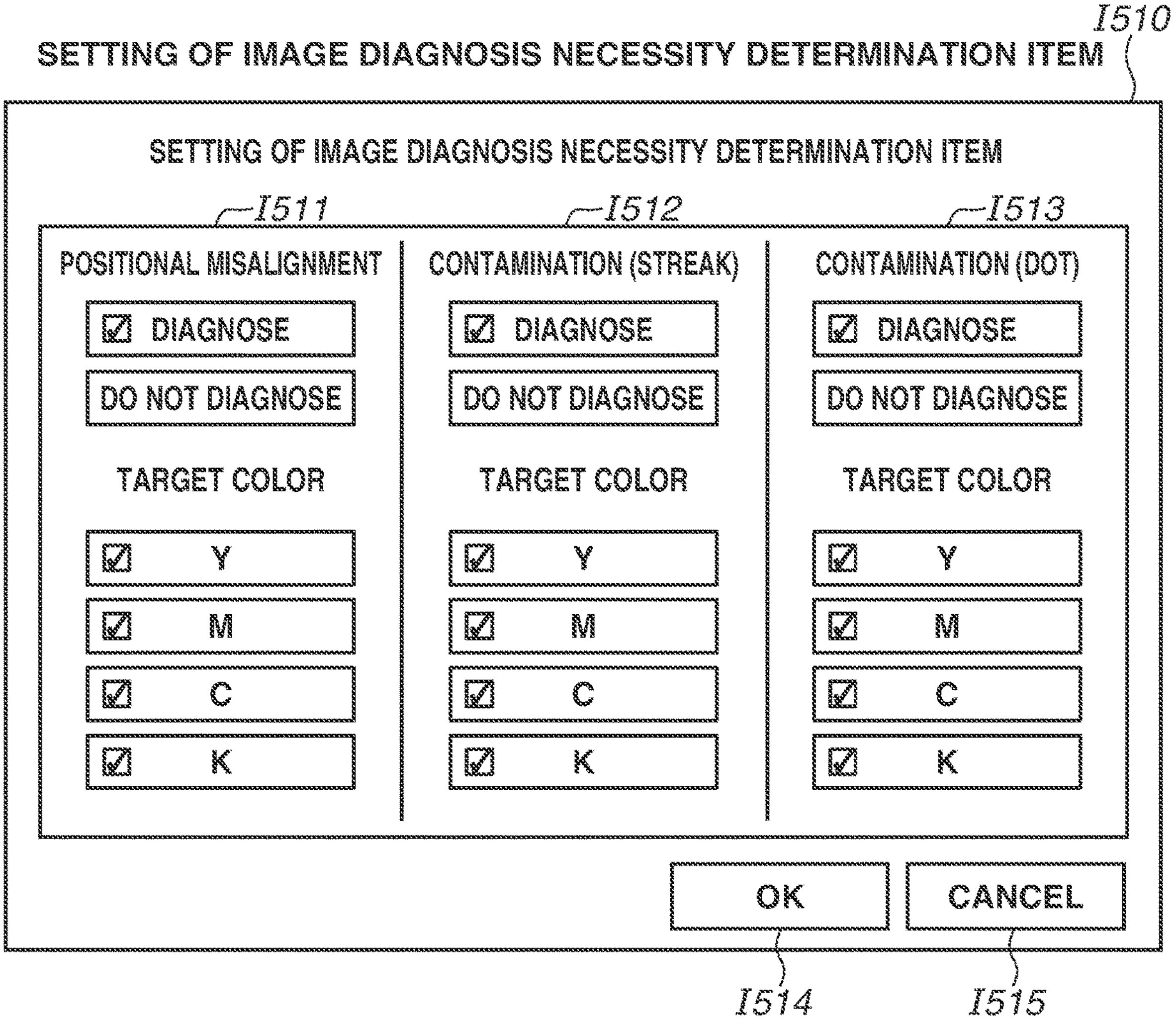

FIGS. 5A and 5B are diagrams illustrating examples of environmental setting screens of image diagnosis according to the present embodiment, displayed on the display unit 241 of the inspection apparatus 109. These environmental setting screens of image diagnosis may be displayed on the display 225 of the printing apparatus 107 or the display 212 of the external controller 102. Settings selected from the environmental setting screens of image diagnosis are stored in the HDD 256 of the inspection apparatus 109.

FIG. 5A illustrates an example of a screen for setting the environment of image diagnosis. An image diagnosis environmental setting screen I500 includes environmental setting items I501, I502, and I503 relating to image diagnosis, a determination item setting button I504, an OK button I505, and a cancel button I506. The environmental setting item I501 is an item for setting a timing of determining the necessity of image diagnosis. A timing of determining the necessity of image diagnosis can be set by selecting from three options, i.e., "Do not determine automatically", "Determine immediately after occurrence of an inspection NG page in an inspection job", and "Determine after ending an inspection job". These three options are provided as toggle-display items, and a selected item is displayed in an emphasized state. For example, in the screen I500 illustrated in FIG. 5A, an item for determining the necessity immediately after occurrence of the inspection NG page in the inspection job is selected.

The environmental setting item I502 is an item for setting the operation to be executed in a case where the user determines that image diagnosis has to be executed at the time of occurrence of inspection NG. In FIG. 5A, an option of automatically executing image diagnosis and an option of displaying an image diagnosis execution button are provided as toggle-display items. Further, as the image diagnosis items, an option of diagnosing a NG detection factor (i.e., content of image defects) and an option of diagnosing all of factors are provided as toggle-display items. The environmental setting item I503 is an item for setting an inspection item to be specified as a target when the necessity of image diagnosis is determined. An option of executing determination with respect to all of detection items and an option of specifying a detection item of which the determination is to be executed are provided as toggle-display items. In a case where the user selects the option of specifying a detection item of which the determination is to be executed, the determination item setting button I504 is brought into an operable state. In a case where the user selects the option of executing determination with respect to all of detection items, the determination item setting button I504 is grayed out and brought into an inoperable state.

When the determination item setting button I504 is pressed, an image diagnosis necessity determination item setting screen I510 is displayed. In a case where the OK button I505 is pressed, content of setting is saved in the HDD 256, and the image diagnosis environmental setting screen I500 is closed. When the user does not want to save the content set to the image diagnosis environmental setting screen I500, the user presses the cancel button I506 to close the image diagnosis environmental setting screen I500.

FIG. 5B illustrates an example of a screen for setting the item in which the necessity of image diagnosis is to be determined. The image diagnosis necessity determination item setting screen I510 includes determination item settings I511, I512, and I513, an OK button I514, and a cancel button I515. The determination item settings I511, I512, and I513 are items for setting whether to execute image diagnosis depending on the items of printing defect factors (i.e., content of image defects) when inspection NG occurs.

The determination item setting I511 is an item for setting whether to execute image diagnosis in a case where a defect indicated by the inspection result is misalignment of an image forming position occurring in a printing medium. The determination item setting I512 is an item for setting whether to execute image diagnosis in a case where a defect indicated by the inspection result is streak-like contamination or unprinted part occurring in a read image. There is a possibility that the streak-like contamination or the unprinted part occurs in a vertical direction or a horizontal direction of the printed matter depending on a cause of occurrence. In FIG. 5B, both of the vertical streak and the horizontal streak are regarded as targets. The determination item setting I513 is an item for setting whether to execute image diagnosis in a case where a defect indicated by the inspection result is dot-like contamination or unprinted part occurring in a read image. The user can select whether to execute diagnosis with respect to each of the determination item settings I511, I512, and I513, and options of executing/not executing diagnosis are provided as toggle-display items. Further, in a case where the user has set the option of executing diagnosis with respect to each of the determination item settings I511, I512, and I513, the user can also set a target color to be diagnosed. The user can individually set a color used for image formation as a target color. In FIG. 5B, setting can individually be executed with respect to toner colors of Y, M, C, and K. A toner color is brought into a selected state when a button corresponding to that toner color is pressed once and brought into a non-selected state when the button is pressed again. When the OK button I514 is pressed, content of setting is saved in the HDD 210, and the image diagnosis necessity determination item setting screen I510 is closed and brought back to the image diagnosis environmental setting screen I500. In a case where the user does not want to save the content set to the image diagnosis necessity determination item setting screen I510, the user can bring the screen I510 back to the image diagnosis environmental setting screen I500 by pressing the cancel button I515.

FIGS. 6A to 6D illustrate examples of screens relating to the operation of image diagnosis according to the present embodiment, which are displayed on the display unit 241. These screens relating to the operation of image diagnosis may be displayed on the display 225 of the printing apparatus 107 or the display 212 of the external controller 102.

Figure 6A:
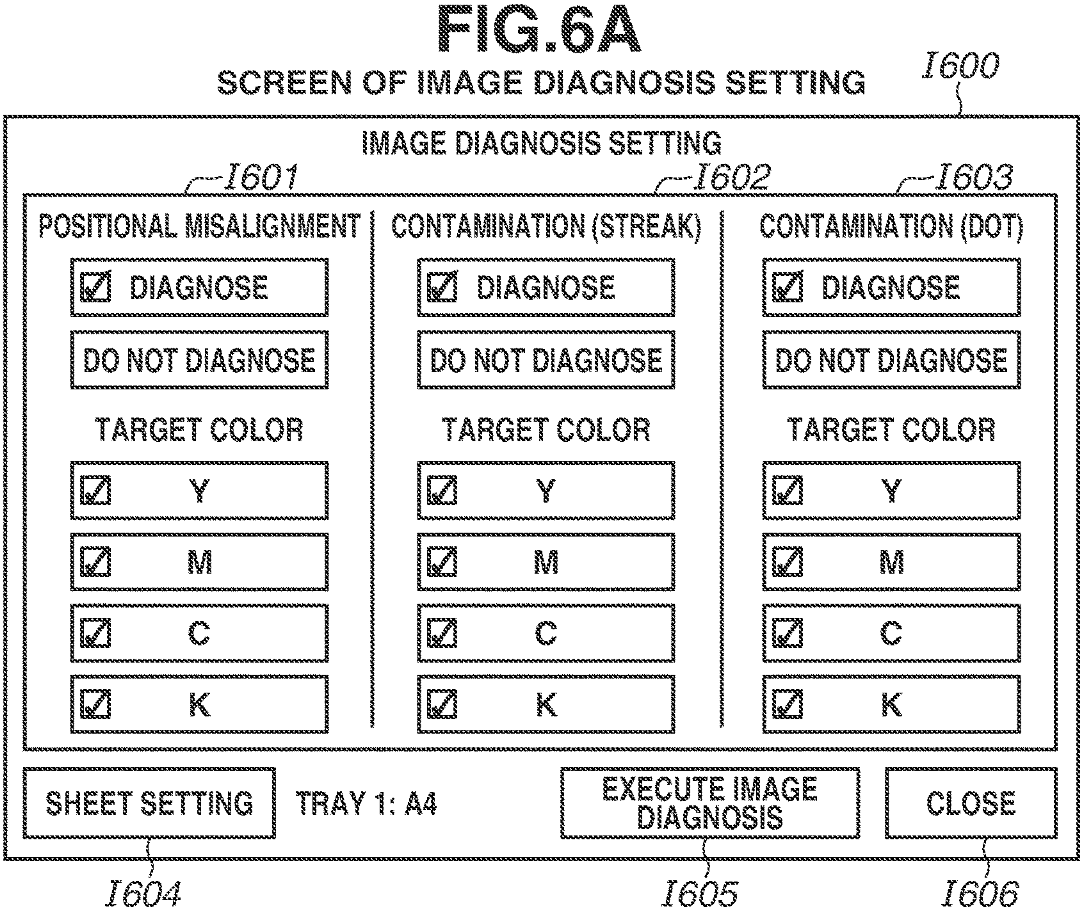
FIGS. 6A to 6D are diagrams illustrating examples of a UI displaying a screen of an image diagnosis result.

FIG. 6A illustrates an example of a screen for inputting instructions to execute image diagnosis. An image diagnosis setting screen I600 includes image diagnosis target settings I601, I602, and I603, a sheet setting I604, a diagnosis execution button I605, and a close button 606. The image diagnosis target settings I601, I602, and I603 are items for specifying target factors on which the image diagnosis is to be executed.

The user can set whether to execute image diagnosis with respect to various factors, i.e., positional misalignment, streak-like contamination, and dot-like contamination, through the image diagnosis target settings I601, I602, and I603. The user can select whether to execute diagnosis, and options of executing/not executing diagnosis are provided as toggle-display items. Further, in a case where the user has set the option of executing diagnosis with respect to each of the image diagnosis target settings I601, I602, and I603, the user can also set a target color to be diagnosed. The user can individually set a color used for image formation as a target color. In FIG. 6A, setting can individually be executed with respect to toner colors of Y, M, C, and K.

A toner color is brought into a selected state when a button corresponding to that toner color is pressed once and brought into a non-selected state when the button is pressed again. The sheet setting I604 includes a button used for setting a sheet to be used for image diagnosis and description of the setting content.

A sheet setting screen is displayed when the sheet setting button I604 is selected, so that the user can set a sheet used for image diagnosis. The content of setting is described in the setting content. In this example, a sheet is set on a tray basis, and the setting content displays a state where A4-size sheets stored in a tray 1 are selected. The user presses the diagnosis execution button 1605 to input instructions to execute image diagnosis based on the content set to the image diagnosis target settings 1601, 1602, and 1603 and the sheet setting 1604. The user presses the close button 1606 to close the image diagnosis setting screen 1600 without executing image diagnosis and change the display to the previous screen.

Figure 6B:
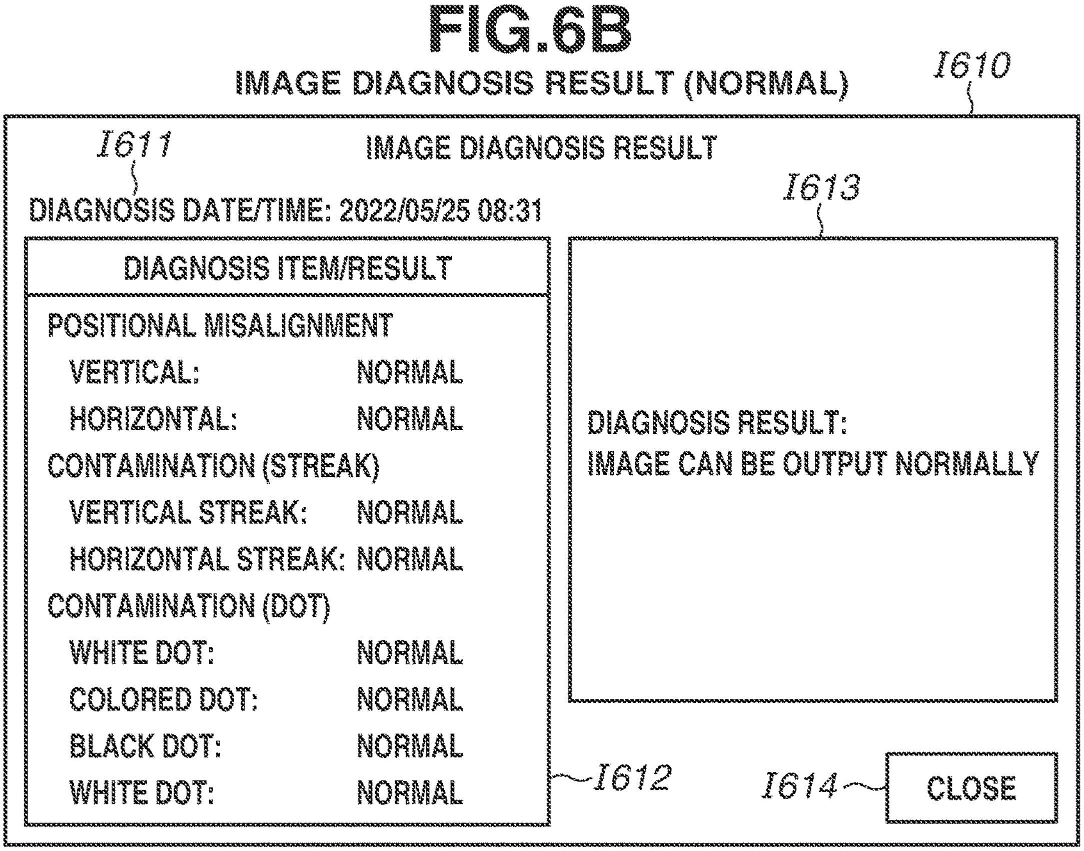
Figure 6C:
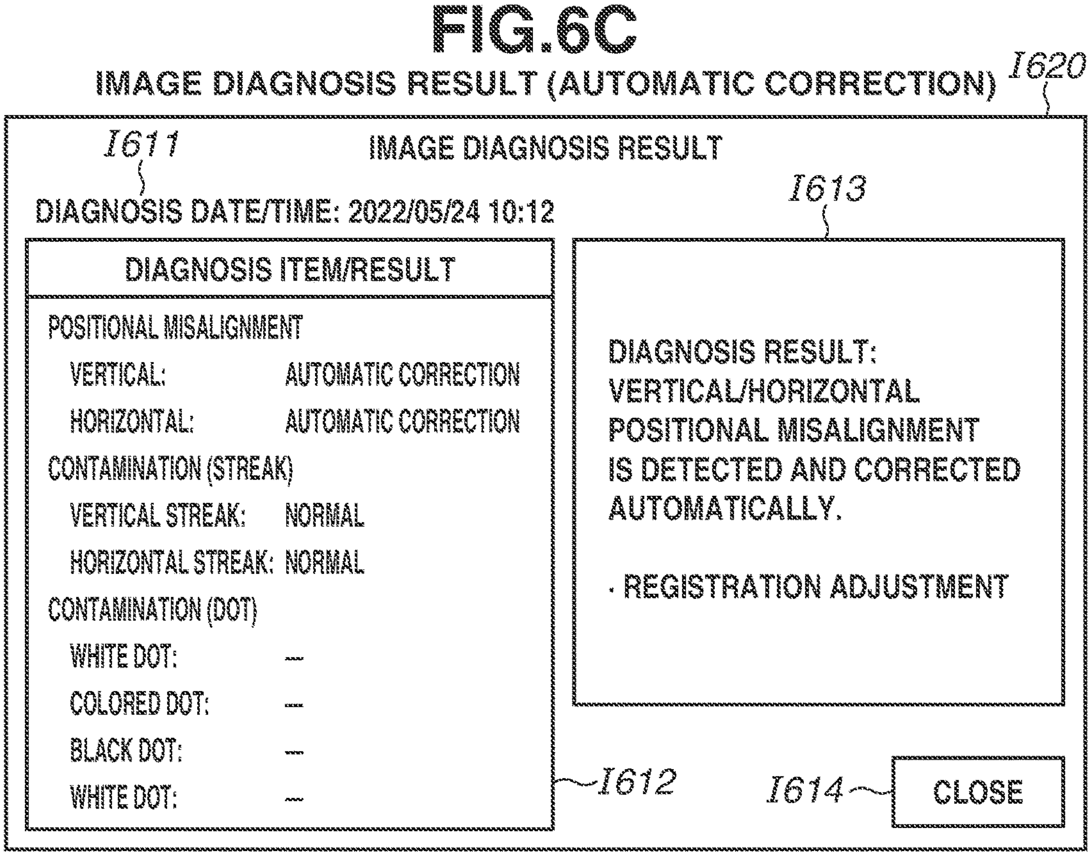
Figure 6D:
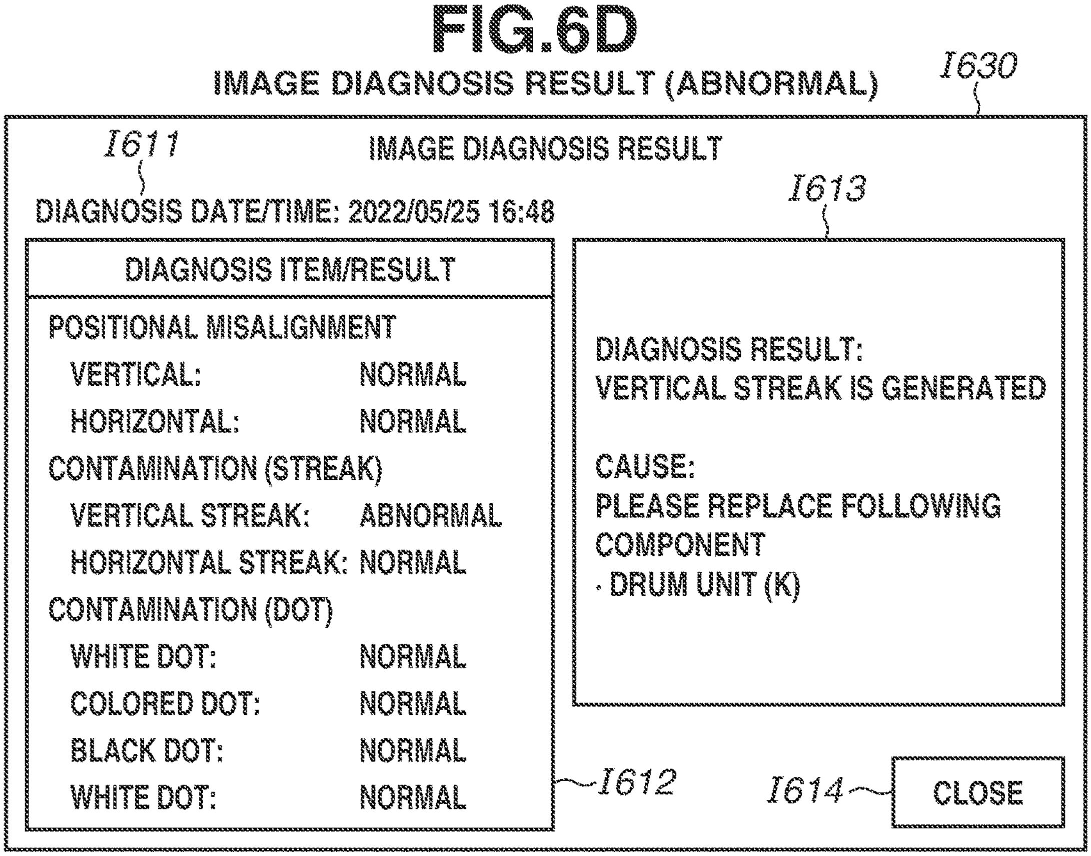

FIGS. 6B, 6C, and 6D are examples of screens which display execution results of image diagnosis. An image diagnosis result screen 1610 in FIG. 6B is a screen to be displayed when the image diagnosis result is normal. The image diagnosis result screen 1610 includes a diagnosis date/time 1611, a diagnosis result of each item 1612, an image diagnosis result 1613, and a close button 1614. Date and time when an execution result of image diagnosis is acquired is displayed on the diagnosis date/time 1611. The diagnosis result of each item 1612 displays details of a diagnosis results of each diagnosis item specified as an image diagnosis target. The diagnosis result of each item 1612 displays a result of each diagnosis item in detail based on item units set to the image diagnosis target settings 1601, 1602, and 1603. Herein, "Normal", "Abnormal", or "Execute Automatic Correction" is displayed as a result of each diagnosis item, and a symbol "–" is displayed thereon when the item is not a diagnosis target. The image diagnosis result 1613 is a column which displays a result of image diagnosis based on the content described in the result of each diagnosis item 1612. In this column, a specific wording or a message that can be understood by the user is displayed. When the close button 1614 is pressed, the image diagnosis result screen 1610 is closed, and the display is changed to the previous screen.

FIG. 6C is an example of an image diagnosis result screen 1620 displayed when automatic correction of positional misalignment is executed after a printing defect caused by positional misalignment is detected as an execution result of image diagnosis. A message, "Execute Automatic Correction", is displayed in each of the items of vertical and horizontal positional misalignment specified as the automatic correction target items included in the diagnosis result of each item 1612, and content of executed automatic correction is displayed on the image diagnosis result 1613.

FIG. 6D is an example of an image diagnosis result screen 1630 displayed when abnormality is detected with respect to the item "vertical streak" included in the item "contamination (streak)", as a result of execution of image diagnosis. The diagnosis result of each item 1612 displays a comment "Abnormal" in the item of "vertical streak" included in the item of "contamination (streak)", where abnormality is detected. Then, the image diagnosis result 1613 displays a cause of abnormality and countermeasures thereof together with the diagnosis item where abnormality is detected.

According to the present embodiment, in a case where the inspection apparatus 109 detects image defects in the images printed on a plurality of sheets, the inspection apparatus 109 determines necessity of image diagnosis and executes the image diagnosis based on the determination. In a case where the image defect is detected, the inspection apparatus 109 detects a factor of the defect of the image read by the image reading sensor (reading unit), and determines a state of the defect occurring in the print job.

Figure 7:
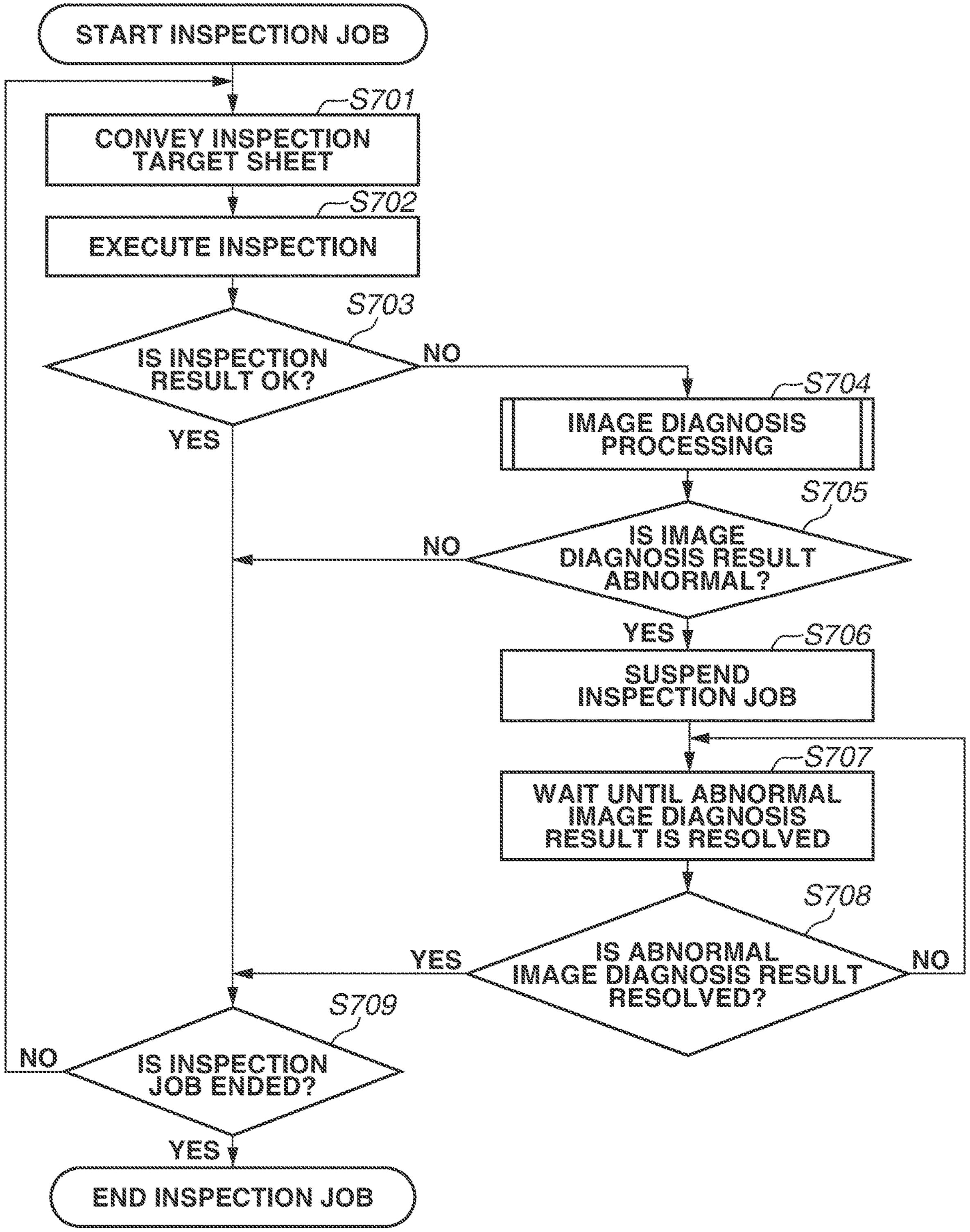
FIG. 7 is a flowchart illustrating processing for executing inspection and image diagnosis according to the present embodiment.

FIG. 7 is a flowchart illustrating processing for executing image diagnosis after executing inspection processing. A series of processes illustrated in this flowchart is executed by the CPU 238 of the inspection apparatus 109 existing in the system. The processing of the inspection apparatus 109 is executed by a control program which the CPU 238 has read from the HDD 256 and loaded on the memory 239.

When the control program executed by the CPU 238 of the inspection apparatus 109 receives an instruction to start executing the inspection job from the user, an instruction to start printing is transmitted to the printing apparatus 107 from the external controller 102. A recording sheet on which an image is formed by the printing apparatus 107 is conveyed to the inspection apparatus 109 from the printing apparatus 107 via the inserter 108.

In step S7017, the CPU 238 conveys a sheet on which an inspection target image is formed to a conveyance path.

In step S702, the CPU 238 instructs the image reading sensor (reading unit) to read the sheet, and executes inspection according to the conveyance timing of the sheet. In the inspection, the CPU 238 saves the read image in the HDD 256, determines whether an image defect has occurred as a result of inspection, determines a factor if the image defect has occurred, and records the content of determination as an inspection result. The content of the determined inspection result is recorded in the memory 239. Then, the processing proceeds to step S703.

In step S703, the CPU 238 determines whether the inspection result of the inspection processing is "OK" or "NG". In a case where the inspection result is "OK" ("OK" in step S703), the processing proceeds to step S709. In a case where the inspection result is "NG" ("NG" in step S703), the processing proceeds to step S704. In step S704, the CPU 238 executes the image diagnosis processing. The image diagnosis processing is described in detail with reference to FIG. 8.

When the CPU 238 executes and ends the image diagnosis processing and acquires a result, the processing proceeds to step S705. In step S705, the CPU 238 determines whether a result of image diagnosis executed in step S704 is abnormal. In a case where a result of image diagnosis is abnormal (YES in step S705), the processing proceeds to step S706. In a case where a result thereof is normal (NO in step S705), the processing proceeds to step S709.

In step S709, based existence/non-existence of an inspection target sheet, the CPU 238 determines whether the inspection job continues. In a case where an inspection target sheet exists (NO in step S709), the processing proceeds to step S701. In a case where an inspection target sheet does not exist (YES in step S709), the processing of this flowchart ends.

In step S706, the CPU 238 transmits a notification of suspending the inspection job (i.e., a notification of suspending image formation) to the CPU 222 of the printing apparatus 107. Then, the processing proceeds to step S707. In step S707, the CPU 238 waits until the user executes operation for resolving the abnormality in the image diagnosis result. When the CPU 238 is notified that the user has performed operation from the CPU 222 of the printing apparatus 107, or when the operation unit 242 of the inspection apparatus 109 is operated, the CPU 238 determines that the user has performed operation, and the processing proceeds to step S708. Herein, replacement or cleaning of components of the printing apparatus 107, or operation/change of the component information of the printing apparatus 107, performed by the user, is regarded as the operation for resolving the cause of abnormality in the image diagnosis result.

In step S708, the CPU 238 checks whether the abnormality in the image diagnosis result has been resolved by the user operation accepted in step S707. For example, in a case where replacement of a component is the operation for resolving the abnormality in the image diagnosis result, the CPU 238 is notified of replacement of the component from the printing apparatus 107 which detects the replacement of the component, or from the user who has replaced the component. Therefore, the CPU 238 determines that abnormality is resolved. In a case where abnormality in the image diagnosis result is resolved (YES in step S708), the processing proceeds to step S709. In a case where abnormality in the image diagnosis result is not resolved (NO in step S708), the processing proceeds to step S707.

Figure 8:
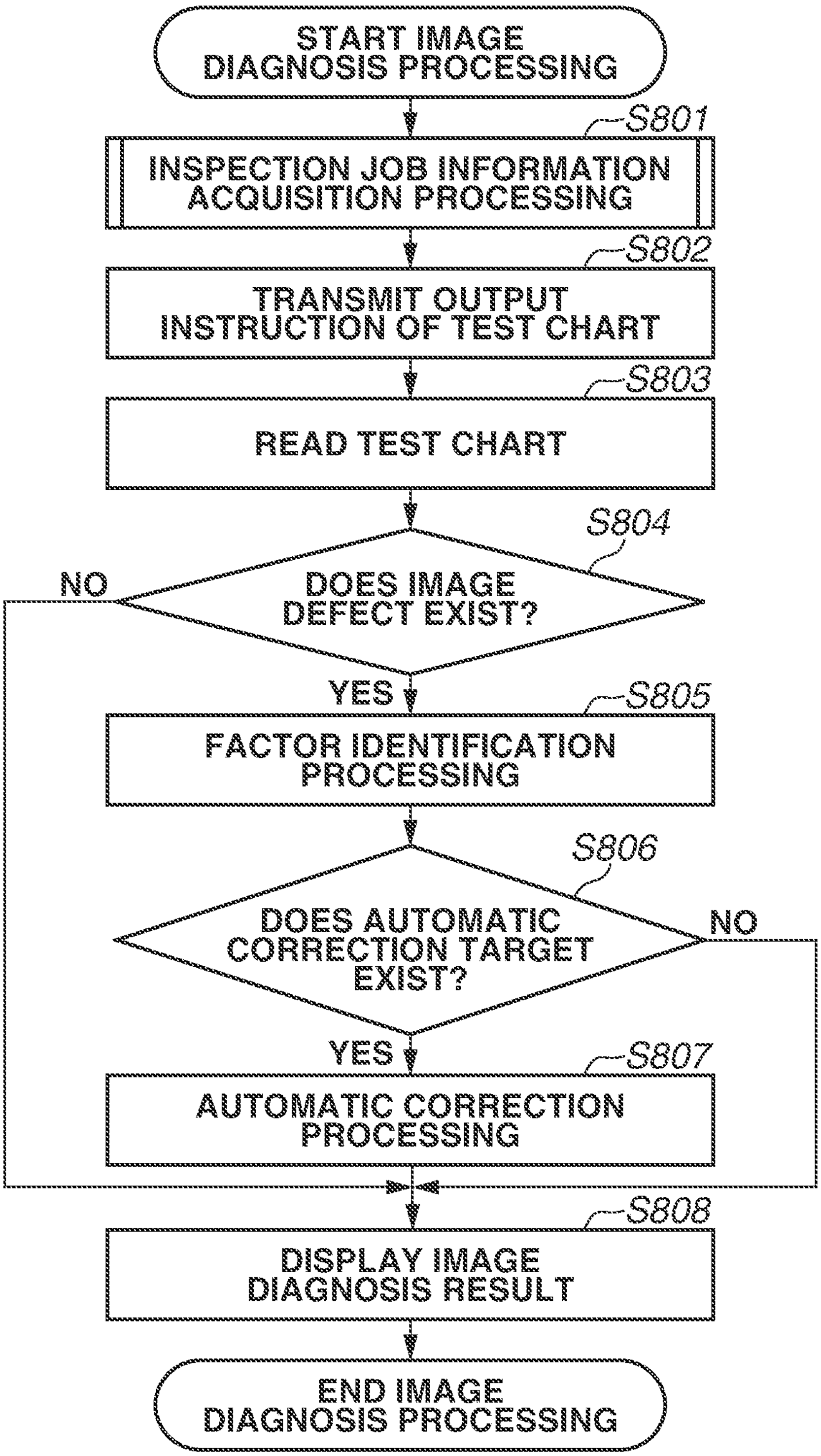
FIG. 8 is a flowchart illustrating processing for executing image diagnosis according to the present embodiment.

FIG. 8 is a flowchart illustrating processing for executing image diagnosis in step S704 of FIG. 7 according to the present embodiment. The series of processes is executed by the CPU 238 of the inspection apparatus 109 by executing the control program read from the HDD 256 and loaded on the memory 239.

In step S801, the CPU 238 executes acquisition processing of information about the inspection job about which the printing apparatus 107 has received instructions from the external controller 102. Details of the acquisition processing of information about the inspection job is described in detail with reference to FIG. 9. When the CPU 238 can acquire the information about the inspection job by executing the above-described processing, the processing proceeds to step S802.

In step S802, the CPU 238 instructs the CPU 222 of the printing apparatus 107 to output a test chart. This output instruction is determined based on the diagnosis item set to the image diagnosis setting screen I600. For example, the CPU 238 instructs the CPU 222 to individually print a test chart for each of the color specifications of the diagnosis item. Data stored in the HDD 221 of the printing apparatus 107 may be used for the image data to be output as the test chart. Alternatively, data stored in the HDD 256 of the inspection apparatus 109 may be transmitted thereto together with the printing instruction. A sheet output as a test chart is determined based on the sheet information acquired through the inspection job information acquisition processing in step S801. When the CPU 238 is notified from the CPU 222 of the printing apparatus 107 that output of the test chart is started, the processing proceeds to step S803.

In step S803, the CPU 238 instructs the image reading sensor to read a sheet according to a conveyance timing of the sheet on which the test chart is output. Because the number of conveyed test charts is changed depending on the setting of the diagnosis item, the reading processing is executed with respect to the number of sheets corresponding to the number of test charts specified by the output instruction in step S802. The CPU 238 stores a read result in the HDD 256, and the processing proceeds to step S804.

In step S804, the CPU 238 checks whether an image defect exists in the image read in step S803. The CPU 238 may similarly determine existence of image defects with respect to all of the images read in step S803, or may determine existence of image defects corresponding to test charts by setting the image defect factors to be determined for each of the test charts depending on the setting of diagnosis items. In a case where the CPU 238 determines that the image defect exists (YES in step S804), the processing proceeds to step S805. In a case where the CPU 238 determines that the image defect does not exist (NO in step S804), the processing proceeds to step S808.

In step S806, with respect to the image defect factor identified in step S804, the CPU 238 determines whether automatic correction can be executed. In a case where a defect factor as a target of automatic correction exists (YES in step S806), the processing proceeds to step S807. In a case where a defect factor as a target of automatic correction does not exist (NO in step S806), the processing proceeds to step S808.

In step S807, the CPU 238 instructs the CPU 222 of the printing apparatus 107 to execute automatic correction. When the CPU 238 is notified from the CPU 222 of the printing apparatus 107 that execution of automatic correction is completed, the CPU 238 records the completion to the automatic correction item stored in the memory 239. Then, the processing proceeds to step S808.

In step S808, the CPU 238 displays an execution result of image diagnosis on the display unit 241. In a case where an image defect does not exist, the CPU 238 determines that the execution result of image diagnosis is normal. In a case where an image defect exists, the CPU 238 determines that diagnosis is normal with respect to the diagnosis item without having a defect, and determines that diagnosis is abnormal with respect to the diagnosis item having a defect, depending on a determined type of image defect. Further, in a case where the CPU 238 determines that diagnosis is abnormal, so that automatic correction is executed, the CPU 238 determines that the image defect is corrected automatically. A result acquired through the above-described determination is displayed as a diagnosis result of each item. Further, in a case where abnormality exists in the diagnosis item, the CPU 238 describes a diagnosis result "Abnormal" and a cause of abnormality in the image diagnosis result I613. In a case where automatic correction is executed, the CPU 238 describes an item on which the automatic correction is executed. In a case where all of diagnosis items is normal, the CPU 238 describes that a diagnosis result is normal. After the image diagnosis result screen is displayed on the display unit 241, the processing of this flowchart ends.

Figure 9:
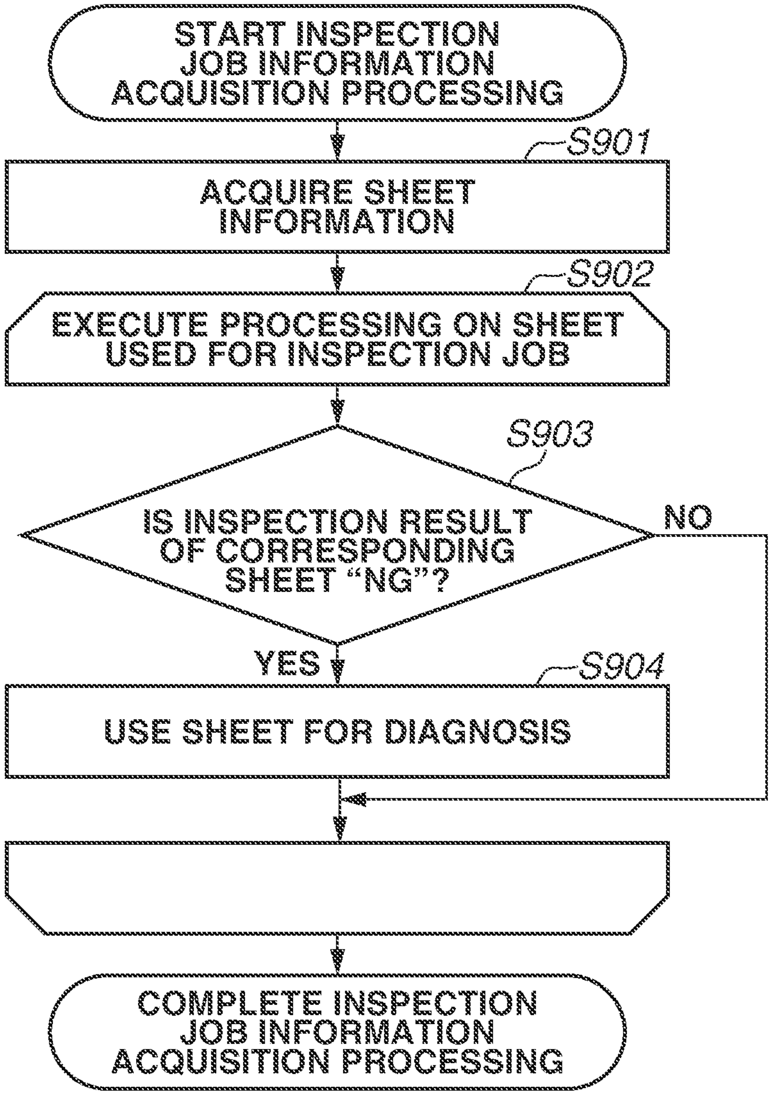
FIG. 9 is a flowchart illustrating processing for executing acquisition of inspection job information according to the present embodiment.

FIG. 9 is a flowchart illustrating the acquisition processing of inspection job information executed in step S801 of FIG. 8 according to the present embodiment. The series of processes is executed by the CPU 238 of the inspection apparatus 109 by executing the control program read from the HDD 256 and loaded on the memory 239.

In step S901, the CPU 238 acquires sheet information of the inspection job about which the printing apparatus 107 has received instructions from the external controller 102. The sheet information of the inspection job is illustrated in FIG. 10. The information in FIG. 10 conforms to the information acquired from the Check Setting link displayed on the inspection result list screen I400 in FIG. 4A, and a print job for the inspection job of the final version of a Company A booklet is described. By acquiring this sheet information, the CPU 238 can acquire information about the inspection job of the final version of the Company A booklet, i.e., information indicating that paper stored in a tray 3 is set as the insertion paper, and information indicating that A3-size coated paper stored in a tray 2 is set as the sheets to be used for the booklet.

In step S902, the CPU 238 repeats the following processing with respect to the sheets used for the inspection job.

In step S903, the CPU 238 determines whether an inspection processing result of the sheet is "NG" in step S703. In a case where the inspection result of the sheet is "NG" (YES in step S903), the processing proceeds to step S904. In a case where the inspection result thereof is "OK" (NO in step S903), the processing proceeds to step S902.

In step S904, the CPU 238 employs the sheet information as the sheet information used for outputting a test chart by the printing apparatus 107 in step S802.

Through the above-described embodiment, in a case where image defects occur in the inspection executed by the user, the user can execute image diagnosis processing by automatically using a sheet used for the inspection job. With this configuration, it is possible to check the image defect associated with the sheet, so that the user can take only countermeasures required for the issue of image defects.

In the present embodiment, the control programs of the inspection and the image diagnosis are executed by the CPU 238 of the inspection apparatus 109. However, the inspection apparatus 109 may transmit a read image to an apparatus such as the printing apparatus 107, the external controller 102, or the PC 103, so that the control processing is executed by the apparatus as a transmission destination of the image.

A hardware configuration, a system configuration, and basic control of the printing system are similar to those described in the first embodiment. Therefore, only a difference will be described. A second embodiment is described with respect to a case where the user inputs an instruction to execute image diagnosis by operating the image diagnosis execution button I403 displayed on the inspection result list screen I400 in FIG. 4A.

Figure 11:
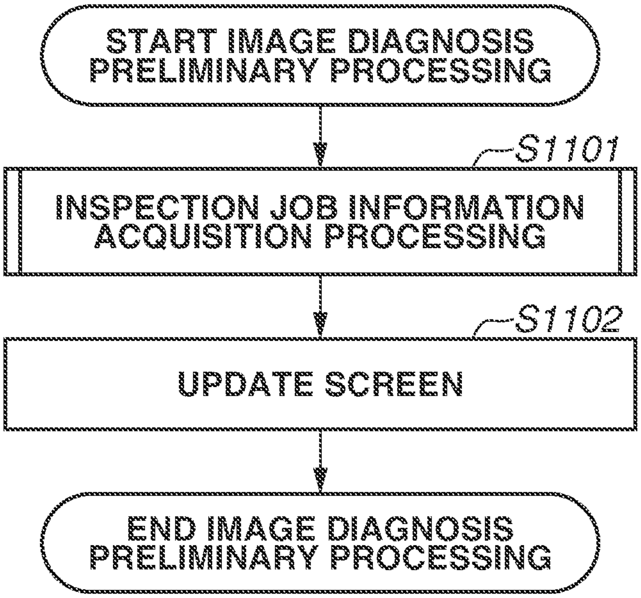
FIG. 11 is a flowchart illustrating processing for executing image diagnosis according to a second embodiment.

FIG. 11 is a flowchart illustrating processing to be executed when the user inputs an instruction to execute image diagnosis by operating the image diagnosis execution button I403 displayed on the inspection result list screen I400 in FIG. 4A. The series of processes is executed by the CPU 238 of the inspection apparatus 109 by executing the control program read from the HDD 256 and loaded on the memory 239.

In step S1101, the CPU 238 executes the inspection job information acquisition processing. Details of the inspection job information acquisition processing are similar to the processing illustrated in FIG. 9.

Figure 12:
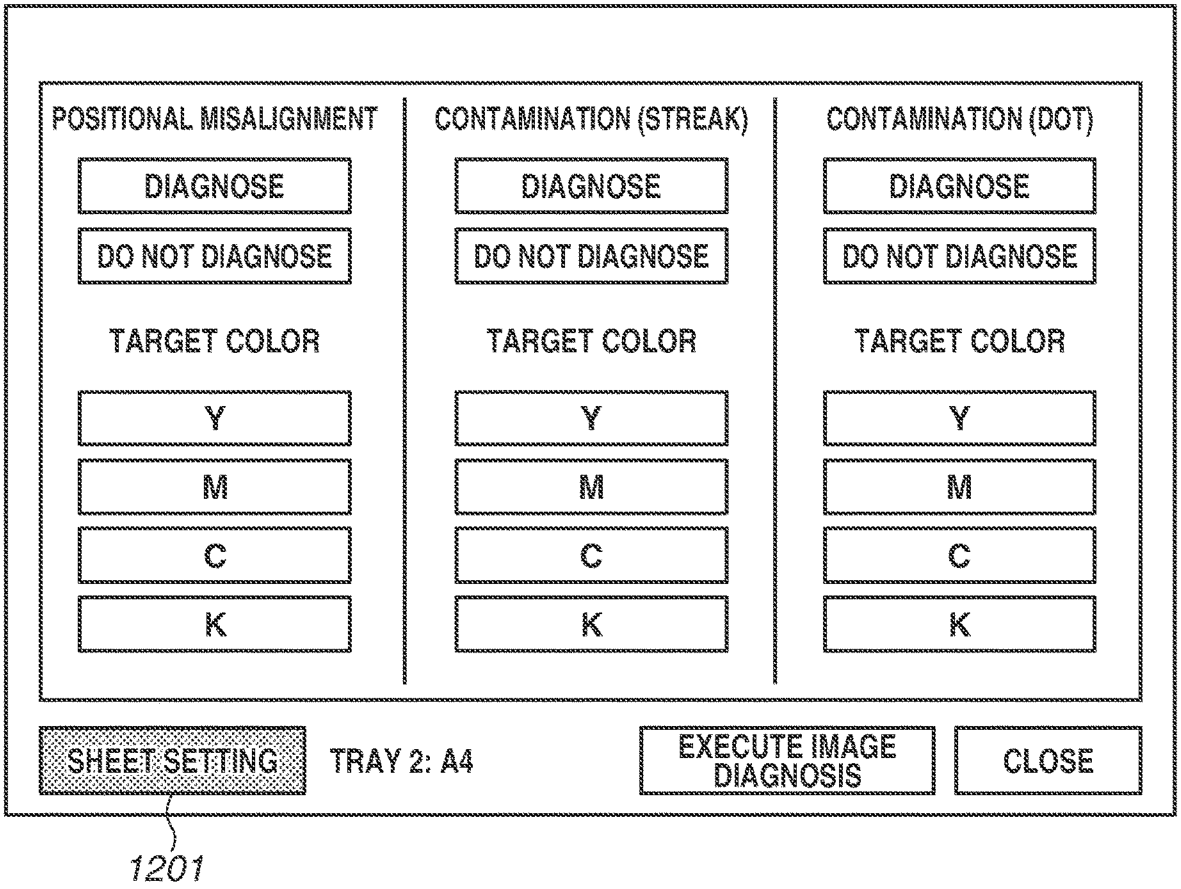
FIG. 12 is a diagram illustrating an example of a UI displaying a detailed setting screen according to the second embodiment.

In step S1102, the CPU 238 sets sheet information to be used for executing image diagnosis based on the sheet information acquired through the inspection job information acquisition processing executed in step S1101. FIG. 12 illustrates an example of a screen displayed when image diagnosis is executed by using the final version of the Company A booklet in FIG. 4A. The inspection job of the final version of the Company A booklet is executed based on the printing information illustrated in FIG. 10. Therefore, in FIG. 12, the information "Tray 2: A3" acquired in step S1101 is previously set.

Through the above-described embodiment, in a case where image defects occur in the inspection executed by the user, the user can execute image diagnosis processing by using a sheet used for the inspection job. With this configuration, it is possible to check the image defect associated with the sheet, so that the user can take only countermeasures required for the issue of image defects.

In the present embodiment, the control programs of the inspection and the image diagnosis are executed by the CPU 238 of the inspection apparatus 109. However, the inspection apparatus 109 may transmit a read image to an apparatus such as the printing apparatus 107, the external controller 102, or the PC 103, so that the control processing is executed by the apparatus as a transmission destination of the image.

According to the aspect of the present disclosure, it is possible to control the system to make a sheet type of a chart used for identifying a defect factor of a printing matter conform to a sheet type used for the inspection of the printed matter.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-132245, filed Aug. 23, 2022, which is hereby incorporated by reference herein in its entirety.

What is claimed is:

1. An inspection apparatus comprising:

an inspection unit configured to execute inspection to determine whether an image defect occurs in a printed matter by comparing, with reference image data, image data as an inspection target, the image data being acquired by a reading unit by reading the printed matter printed on a recording sheet;

an acquisition unit configured to acquire sheet information of the recording sheet used for the inspection, the sheet information including a tray location in which the paper is stored and a type of paper used, according to an operation for inputting instructions to execute image diagnosis, performed on an instruction unit in a case where an inspection result acquired by the inspection unit indicates existence of an image defect; and an image diagnosis unit configured to diagnose content of the image defect by reading a test chart for detecting an image defect, the test chart being printed on a recording sheet of the type acquired by the acquisition unit, wherein the sheet information acquired by the acquisition unit includes sheet information corresponding to the recording sheet for which the inspection result indicates the image defect among a plurality of the recording sheets used for the inspection, and the test chart for detecting the image defect is printed using the recording sheet identified by the sheet information.

2. The inspection apparatus according to claim 1, further comprising a display control unit configured to display an inspection result acquired by the inspection unit on a display unit, wherein the acquisition unit acquires the type of the recording sheet used for the inspection according to the operation for inputting instructions to execute image diagnosis, performed on the instruction unit on a screen on which the inspection result is displayed.

3. The inspection apparatus according to claim 1, wherein the acquisition unit acquires sheet information used to instruct printing of the test chart for detecting the image defect on the recording sheet of the acquired type.

4. The inspection apparatus according to claim 1, wherein the type of the recording sheet includes at least any one of a sheet size and a sheet type.

5. The inspection apparatus according to claim 1, wherein the recording sheet is a sheet of paper.

6. An inspection apparatus comprising:

an inspection unit configured to execute inspection to determine whether an image defect occurs a printed matter by comparing, with reference image data, in image data as an inspection target, the image data being acquired by a reading unit by reading the printed matter printed on a recording sheet based on information about a print job;

an acquisition unit configured to acquire sheet information of the recording sheet used for the inspection, the sheet information including a tray location in which the paper is stored and a type of paper used, according to an operation for inputting instructions to execute image diagnosis, performed on an instruction unit in a case where an inspection result acquired by the inspection unit indicates existence of an image defect; and an image diagnosis unit configured to diagnose content of image defects by reading a test chart for detecting image defects, the test chart being printed on a recording sheet based on sheet information about the print job acquired by the acquisition unit, wherein the sheet information acquired by the acquisition unit includes sheet information corresponding to the recording sheet for which the inspection result indicates an image defect among a plurality of the recording sheets used for the inspection, and the test chart for detecting the image defect is printed using the recording sheet identified by the sheet information.

7. The inspection apparatus according to claim 6, wherein the information about the print job is information about the recording sheet used for printing.

8. A control method of an inspection apparatus comprising:

executing inspection to determine whether an image defect occurs a printed matter by comparing, with reference image data, in image data as an inspection target, the image data being acquired by a reading unit by reading the printed matter printed on a recording sheet;

acquiring sheet information of the recording sheet used for the inspection, the sheet information including a tray location in which the paper is stored and a type of paper used, according to an operation for inputting instructions to execute image diagnosis, performed on an instruction unit in a case where an inspection result acquired from the inspection indicates existence of an image defect; and diagnosing content of the image defect through image diagnosis by reading a test chart for detecting image defects, the test chart being printed on a recording sheet of the type acquired by the acquiring, wherein the sheet information acquired by the acquisition unit includes sheet information corresponding to the recording sheet for which the inspection result indicates the image defect among a plurality of the recording sheets used for the inspection, and the test chart for detecting the image defect is printed using the recording sheet identified by the sheet information.

9. The control method of the inspection apparatus according to claim 8, further comprising:

displaying an inspection result acquired from the inspection on a display unit through display control, wherein the acquiring acquires the type of the recording sheet used for the inspection according to the operation for inputting instructions to execute image diagnosis, performed on the instruction unit on a screen on which the inspection result is displayed.

10. The control method of the inspection apparatus according to claim 8, wherein the acquiring acquires the sheet information of the recording sheet in which existence of the image defect is determined by the inspection, and prints a test chart for detecting the image defect on a recording sheet of the acquired type.

11. The control method of the inspection apparatus according to claim 8, wherein the type includes at least any one of a sheet size and a sheet type.

12. The control method of the inspection apparatus according to claim 8, wherein the recording sheet is a sheet of paper.

13. A control method of an inspection apparatus comprising:

executing inspection to determine whether an image defect occurs in a printed matter by comparing, with reference image data, image data as an inspection target, the image data being acquired by a reading unit by reading the printed matter printed on a recording sheet based on information about a print job;

acquiring sheet information of the recording sheet used for the inspection, the sheet information including a tray location in which the paper is stored and a type of paper used, according to an operation for inputting instructions to execute image diagnosis, performed on an instruction unit in a case where an inspection result acquired from the inspection indicates existence of an image defect; and diagnosing content of the image defect through image diagnosis by reading a test chart for detecting image defects, the test chart being printed on a recording sheet based on information about a print job acquired by the acquiring, wherein the sheet information acquired by the acquisition unit includes sheet information corresponding to the recording sheet for which the inspection result indicates the image defect among a plurality of the recording sheets used for the inspection, and the test chart for detecting the image defect is printed using the recording sheet identified by the sheet information.

14. The control method of the inspection apparatus according to claim 13, wherein the sheet information about the print job is information about the recording sheet used for printing.

15. The inspection apparatus according to claim 1, further comprising:

a control unit, wherein the control unit is configured to, during execution of an inspection job including the inspection, based on the inspection result acquired by the inspection unit indicating the image defect, cause the image diagnosis unit to execute an image diagnosis.

16. The inspection apparatus according to claim 15, wherein the control unit stops the inspection job in a case where a result of the image diagnosis executed by the image diagnosis unit indicates abnormality.

17. The inspection apparatus according to claim 16, wherein the control unit restarts the stopped inspection job when the abnormality is cleared.

* * * * *